US011169571B2

United States Patent
DeMaio

(10) Patent No.: US 11,169,571 B2
(45) Date of Patent: *Nov. 9, 2021

(54) LAPTOP WITH MULTI-DISPLAY FUNCTIONALITY HAVING PIN AND BALL MATING MEMBER

(71) Applicant: Robert Charles DeMaio, Sparks, NV (US)

(72) Inventor: Robert Charles DeMaio, Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,532

(22) Filed: Oct. 9, 2020

(65) Prior Publication Data

US 2021/0096599 A1 Apr. 1, 2021

Related U.S. Application Data

(63) Continuation of application No. 16/589,123, filed on Sep. 30, 2019, now Pat. No. 10,817,020.

(51) Int. Cl.
| | | |
|---|---|---|
| *G06F 1/16* | (2006.01) | |
| *G06F 3/14* | (2006.01) | |
| *G06F 3/02* | (2006.01) | |

(52) U.S. Cl.
CPC .......... *G06F 1/1649* (2013.01); *G06F 1/1624* (2013.01); *G06F 1/1647* (2013.01);
(Continued)

(58) Field of Classification Search
CPC .... G06F 1/1647; G06F 1/1681; G06F 1/1624; G06F 1/1616; G06F 1/1637;
(Continued)

(56) References Cited

U.S. PATENT DOCUMENTS

| | | | |
|---|---|---|---|
| 6,260,486 B1 * | 7/2001 | Boos | B60N 3/001 108/42 |
| 8,390,997 B1 * | 3/2013 | Dominy | G06F 1/1637 361/679.27 |

(Continued)

FOREIGN PATENT DOCUMENTS

CN  107015603 A  8/2017

OTHER PUBLICATIONS

International Search Report dated Nov. 17, 2020 issued in connection with International Application No. PCT/US2020/051703 with (3 pages total).

(Continued)

*Primary Examiner* — Darlene M Ritchie
(74) *Attorney, Agent, or Firm* — Tatonetti IP

(57) ABSTRACT

A portable laptop computing device includes an internal casing that stores secondary displays which extend outward from the device's primary display to thereby increase the amount of displays a user can view while operating the device. The secondary displays are positioned inside a casing of the primary display which is large enough to house at least two displays. The two displays are connected to a hinge which is configured to provide inward and outward movement and rotational movement of the secondary display about 360°. The system can also be implemented with an expansive ecosystem of interoperable components, including an add-on component from which secondary displays can extend, vertical screen adapters which can replace the customary horizontal configuration, a stand to which the add-on component can connect, and a horizontal screen adapter that connects with the stand to provide a convenient three-display set-up when used with the add-on component.

16 Claims, 27 Drawing Sheets

(52) U.S. Cl.
CPC .......... *G06F 1/1679* (2013.01); *G06F 1/1681* (2013.01); *G06F 3/02* (2013.01); *G06F 3/1423* (2013.01); *G06F 1/1616* (2013.01); *G06F 1/1622* (2013.01); *G06F 1/1654* (2013.01)

(58) Field of Classification Search
CPC .... G06F 1/1622; G06F 1/1632; G06F 1/1633; G06F 1/1641; G06F 1/1649; G06F 1/1654; G06F 1/1675; G06F 1/1679; G06F 3/1423; G06F 3/02; G06F 1/1423
See application file for complete search history.

(56) References Cited

U.S. PATENT DOCUMENTS

| | | | | |
|---|---|---|---|---|
| 8,462,103 | B1* | 6/2013 | Moscovitch | G06F 1/1601 345/156 |
| 8,738,101 | B1* | 5/2014 | Myr | G06F 1/1616 455/575.1 |
| 9,158,135 | B1* | 10/2015 | Chaboud | G02F 1/0102 |
| 9,778,681 | B2* | 10/2017 | Richard | H05K 5/0221 |
| 10,082,832 | B1* | 9/2018 | Wang | G06F 1/1616 |
| 10,168,739 | B1* | 1/2019 | Chen | G06F 1/1616 |
| 2003/0095373 | A1* | 5/2003 | Duquette | G06F 1/1632 361/679.04 |
| 2006/0082518 | A1 | 4/2006 | Ram | |
| 2006/0268500 | A1 | 11/2006 | Kuhn | |
| 2007/0285343 | A1* | 12/2007 | Han | G06F 1/1637 345/1.3 |
| 2010/0124008 | A1 | 5/2010 | Chang | |
| 2011/0228463 | A1* | 9/2011 | Matagne | G06F 1/1649 361/679.04 |
| 2011/0252628 | A1* | 10/2011 | Chen | G06F 1/1654 29/592.1 |
| 2011/0292585 | A1* | 12/2011 | Walker | G06F 1/1622 361/679.27 |
| 2016/0070302 | A1* | 3/2016 | Matzke | G06F 1/1632 361/679.04 |
| 2017/0085283 | A1* | 3/2017 | Rayner | F16M 13/022 |
| 2020/0133350 | A1* | 4/2020 | Gault | H05K 5/0226 |

OTHER PUBLICATIONS

Written Opinion of the International Searching Authority dated Nov. 17, 2020 issued in connection with International Application No. PCT/US2020/051703 with (11 pages total).

\* cited by examiner

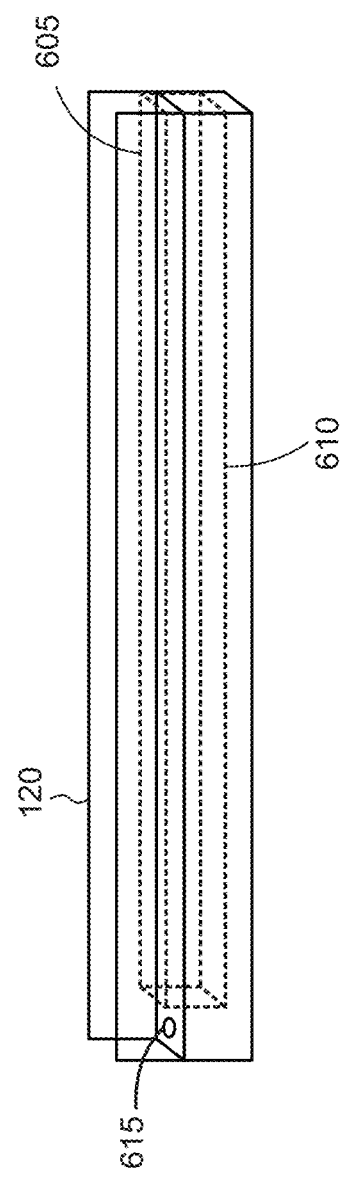
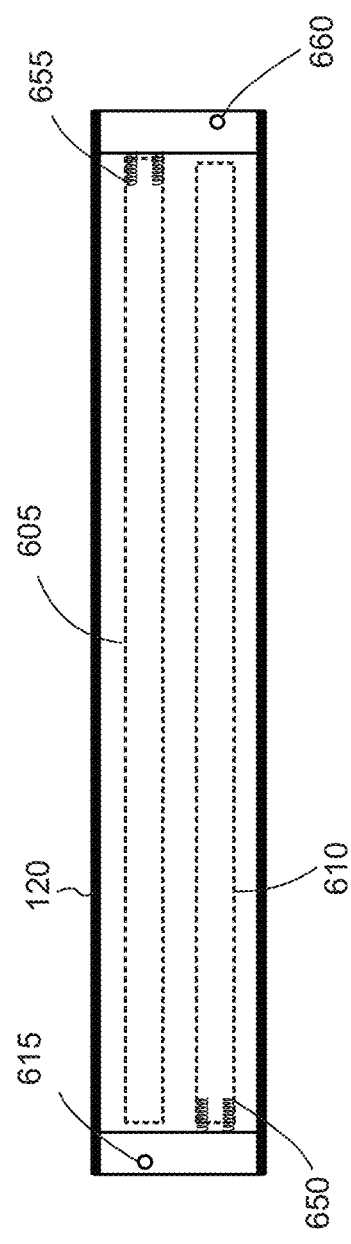
FIG 6A
FIG 6B

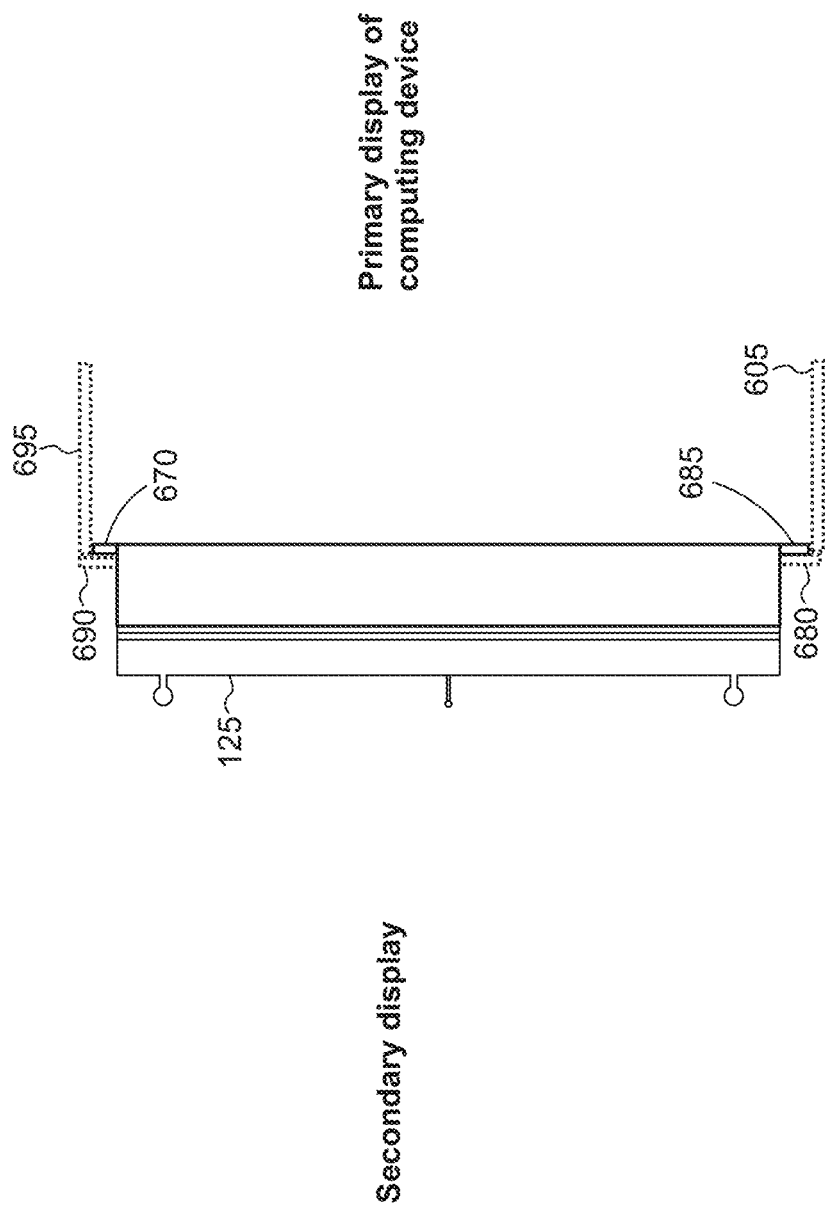

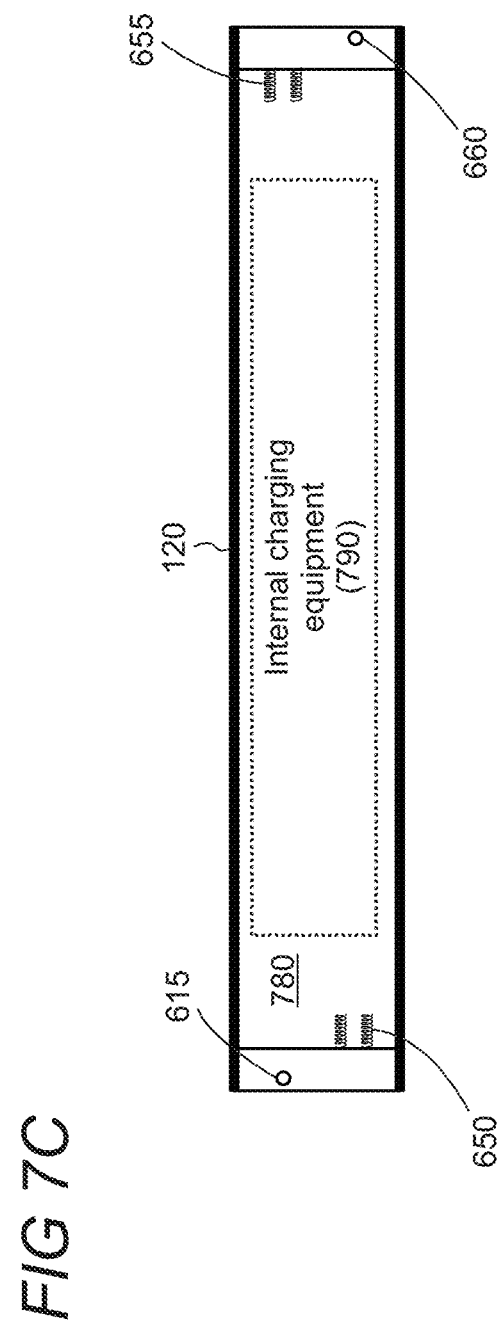

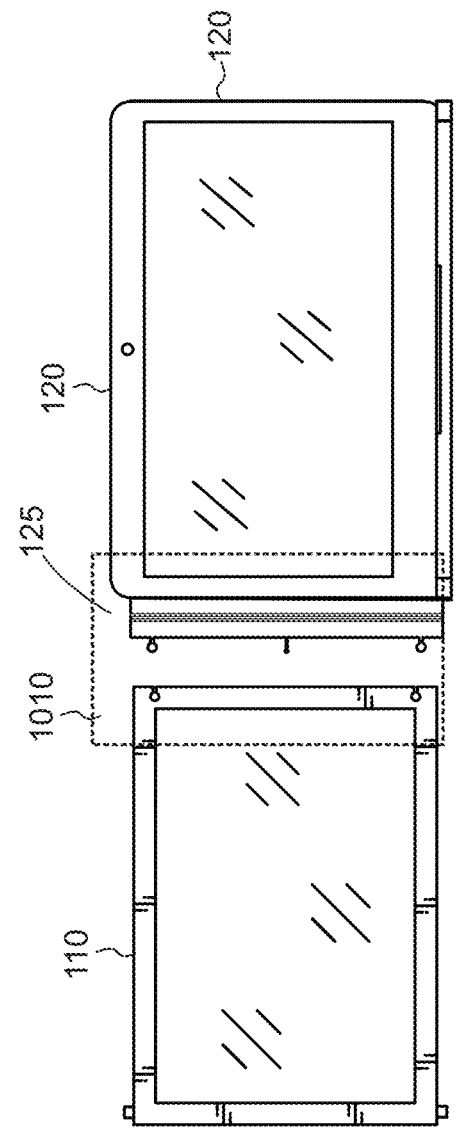

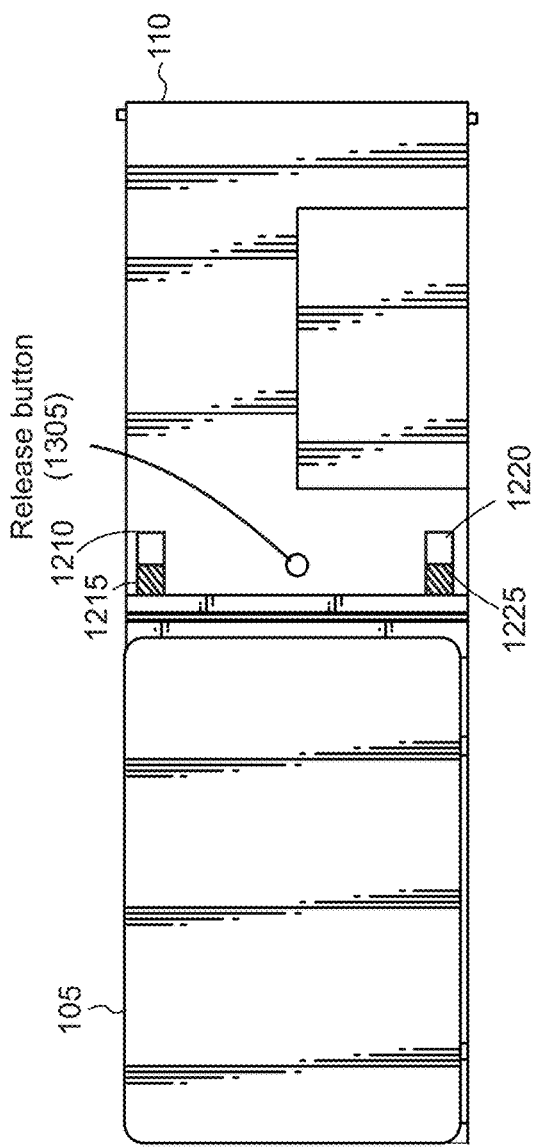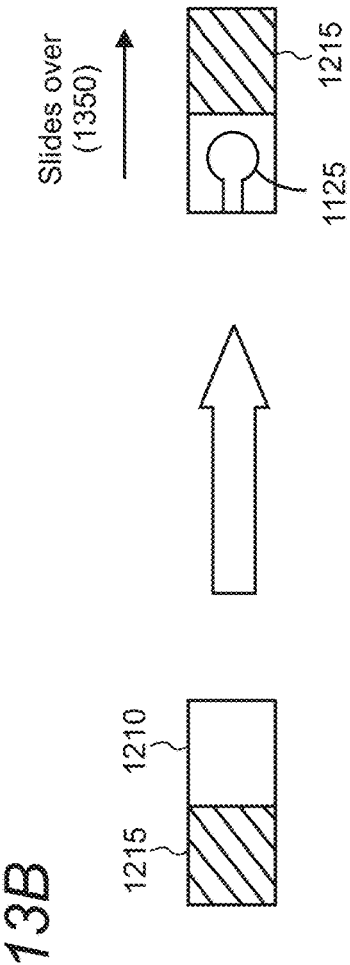
FIG 13A
FIG 13B

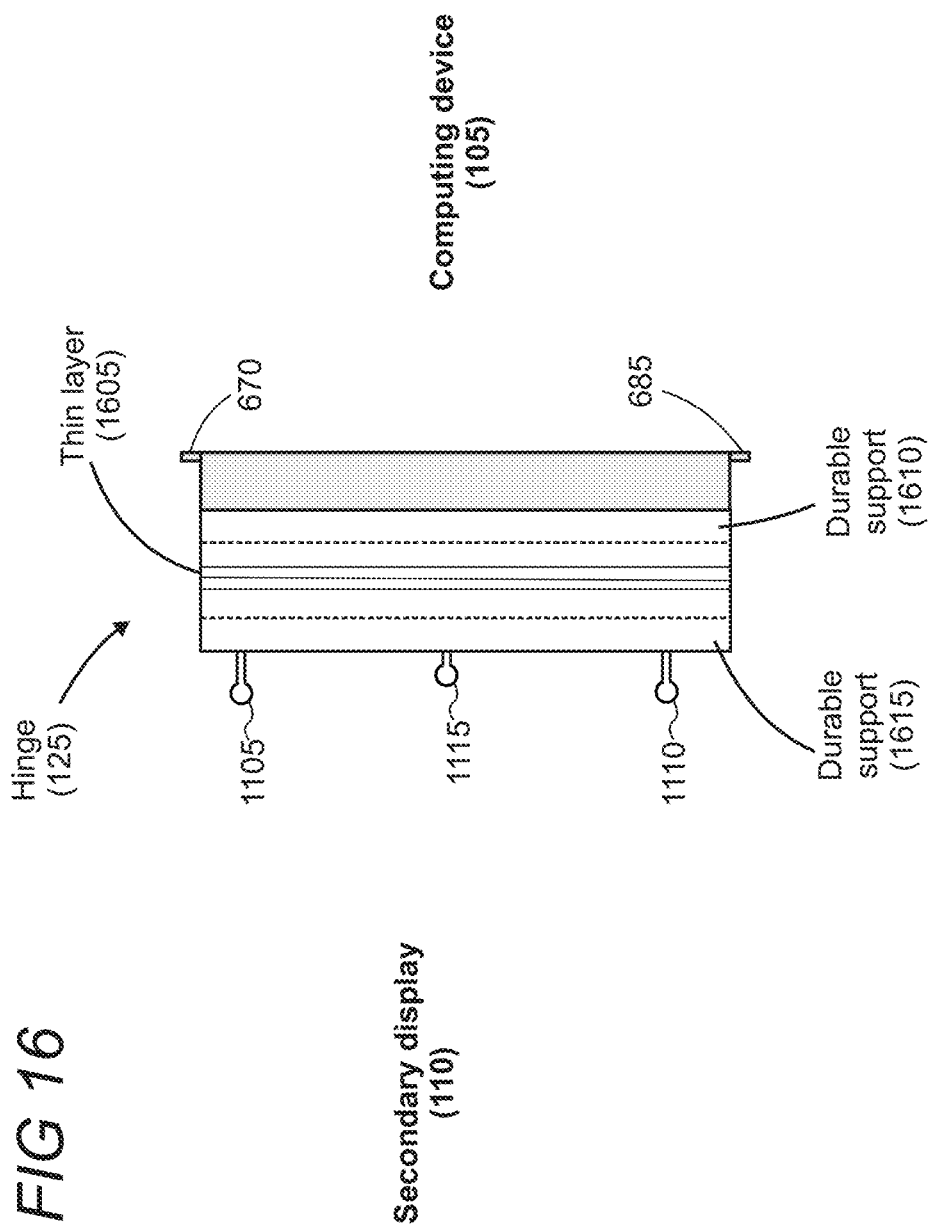

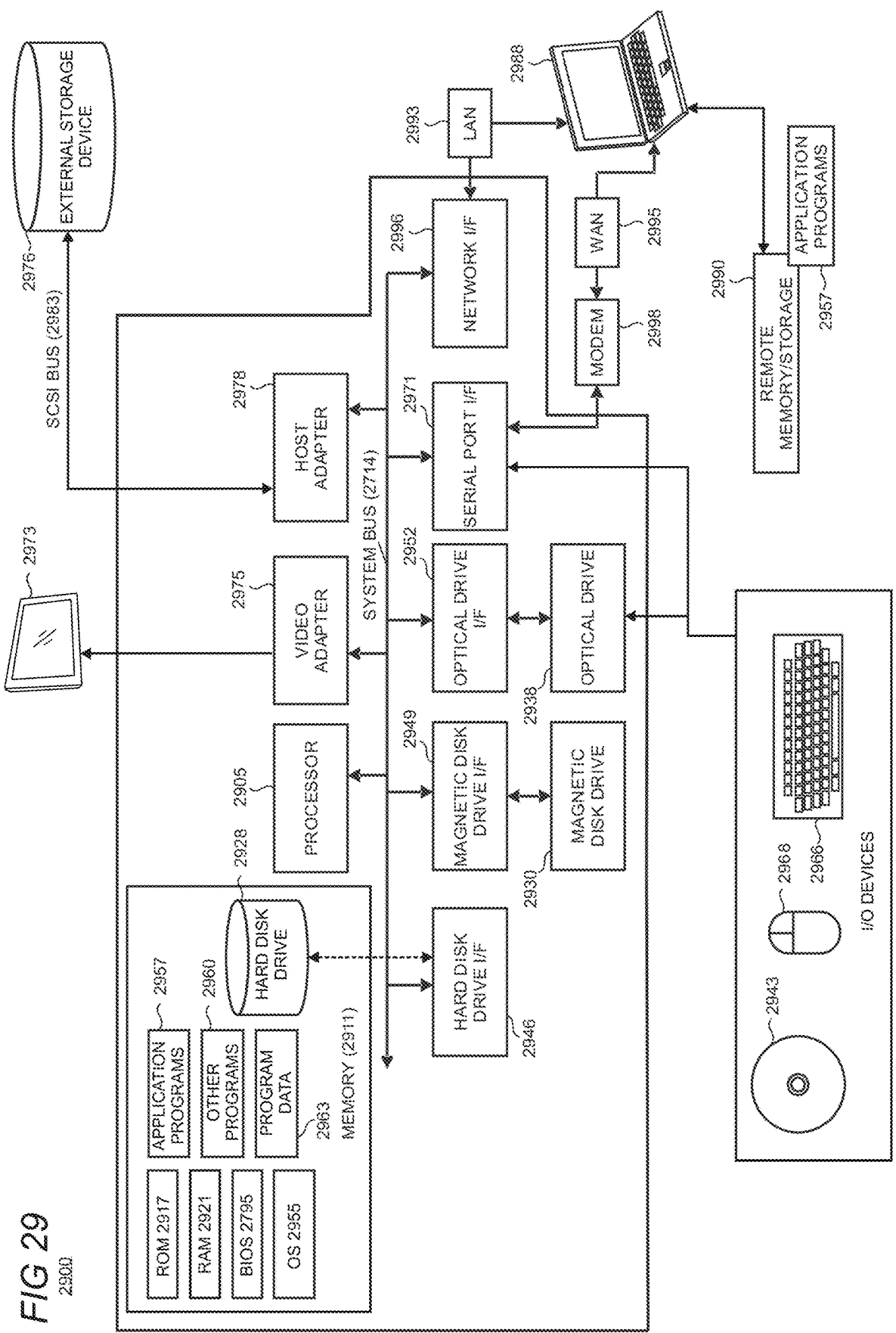

LAPTOP WITH MULTI-DISPLAY FUNCTIONALITY HAVING PIN AND BALL MATING MEMBER

CROSS-REFERENCE TO RELATED APPLICATIONS

This Non-Provisional Utility Application is a Continuation application of and claims the benefit of and priority to U.S. Non-Provisional application Ser. No. 16/589,123, U.S. Pat. No. 10,817,020, filed Sep. 30, 2019, and entitled "Laptop with Multi-Display Functionality," the entire contents of which is hereby incorporated herein by reference. This Non-Provisional Utility Patent Application is related to U.S. Non-Provisional Design patent Ser. No. 29/707,760, filed Sep. 30, 2019, and entitled "Laptop with Adapter Accessories," the entire contents of which is hereby incorporated herein by reference.

BACKGROUND

Some laptop users may wish to view multiple screens to create an improved computing environment. While hooking up multiple display screens to a desktop personal computer (PC) is typical, doing so to a laptop can be difficult due to the often portability and compact structural makeup of a laptop computer. Connecting an additional display screen to the laptop may be difficult for users that are outside of their home, let alone the difficulty of carrying around the additional display screen.

SUMMARY

A portable laptop computing device includes an internal casing that stores secondary displays which extend outward from the device's primary display to thereby increase the amount of displays a user can view while operating the device. The secondary displays are positioned inside an internal cavity of the primary display which is large enough to house at least two secondary displays. The computing device may have one or two secondary displays that extend laterally from a left and right side of the primary device's primary display. A screen release button is exposed on a side of each secondary display which, responsive to being pressed by a user, causes a respective secondary display to release from its secured position inside the primary display. One or more spring-loaded locking pins extending from a top and bottom of the secondary displays align and lock into corresponding holes on the casing within the internal cavity of the primary display. The locking pins extend from outside the housing of the secondary displays and attach to the screen release mechanism inside the secondary displays which is connected to the screen release button. Pressing the screen release button causes the locking pins to push inward with the button and thereby causes the locking pins to move downward and release from the primary display's holes. Each secondary display has its own release mechanism inside the primary display of the computing device, in which actions on one secondary display does not correlate to actions of the other secondary display, if two displays are available.

The secondary displays extend laterally from the primary display once released. A hinge to which a respective secondary display attaches enables dynamic and adjustable positions for the secondary displays to enhance user experiences while operating the computing device. The hinge is attached to and extends from tracks within the primary display of the computing device to enable inward and outward movement of the hinge and secondary displays relative to the primary display. A base within the internal cavity of the primary display may have a set of fixed tracks or grooves on which the hinge and secondary displays slide.

Extending from the hinge are two pegs and a center pin. The top and bottom male pegs engage with respective female peg openings on the secondary display. The size and shape of the female peg openings correspond to a size and shape of the male pegs. The pin is substantially centrally located on the hinge and has a ball joint that is received inside a receiving socket in the secondary display. The ball joint enables 360° rotational movement of the secondary display about the pin's axis while still being connected to the hinge of the primary display. The secondary display may be tilted when the center pin is inserted into the socket, and then rotated to secure the male pegs into the female peg openings. The male pegs are free to move through the corresponding female peg openings so long as a sliding element is pushed in an opened position to allow the pegs to move. The sliding elements are implemented to, for example, prevent the secondary display from inadvertently moving. In typical implementations, the sliding elements are positioned on a rear of the secondary displays.

The hinge may be comprised of durable support on two opposing ends and a thin layer of support in the center to enable hinged movement (e.g., toward and away from the user) of the secondary displays. The respective durable support layers may be comprised of a metal material, such as titanium, and are positioned on the primary display and the secondary display sides of the hinge to provide sufficient support to laterally hold the attached secondary display. The thin central layer may be a thinner plastic or metal material that is capable of bending inward and outward to provide the user with greater control over the secondary display's positioning. The thin layer may have an indentation that forms a v-shape to further enable the hinge to move forward and backward.

An add-on component is configured with the same functionality of the primary display of the laptop computing device described above for scenarios in which a user wishes to add additional displays to enhance user experiences for a standard laptop computer. The add-on component has an internal cavity to receive the secondary displays and has tracks and a hinge to which the secondary displays attach. The add-on component includes arms which slide over and secure to the user's standard computing device (e.g., laptop in typical implementations). Top arms engage directly and rest on a top of the computing device and opposing side arms grip and slide onto left and right sides of the primary display of the user's device. The space between the arms is big enough to accommodate a range of laptop sizes. For example, while the arms may be wide enough to fit around a 17 inch primary display laptop computer, the opposing side arms may move inward (and back outward) about sliding tracks to secure to smaller primary displays (e.g., 15 inch, 13 inch, etc.). Furthermore, removable rubber inserts can fit inside the add-on component's arms to accommodate thinner laptop sizes, if necessary.

Other implementations using the system described herein are available to provide an ecosystem of hardware that can satisfy a range of use scenarios. For example, the add-on component can fit inside a U-shaped stand to provide a portable option on which the add-on component can rest without a laptop. In this scenario, a user may position a laptop in front of the stand to provide the three-display set-up. A horizontal attachment can attach to a front of the stand inside which a thin display screen can rest to likewise provide the user with a three-display system. The horizontal attachment can include openings through which wires and other connector mechanisms can extend to provide the user with a desktop set-up that leverages the add-on component for the additional two displays.

A vertical display attachment can be implemented in which the user can replace the customary horizontal secondary displays with a vertically oriented secondary display. The vertical display attachment may be utilized on the computing device or add-on component. The vertical display includes an opening inside which the display can be placed. The female peg openings and center pin socket on the vertical attachment operates similar to the horizontal secondary display discussed above, but may be re-positioned to accommodate the vertical attachment's increased vertical length. Symmetrical components are utilized for the components which enables a user to remove and place the vertical display attachment on the opposite side's hinge of the computing device or add-on component. This may be done, for example, if the user wishes to reverse the direction at which the vertical display attachment is facing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 6A-C show illustrative environments of tracks inside the primary display and on which hinges and the secondary displays slide;

FIGS. 7A-C show illustrative environments of the secondary displays adjacently disposed inside the primary display of the computing device and the charging equipment inside the primary display;

FIG. 10 shows an illustrative environment in which a secondary display is detached from and openings are aligned with pegs on the primary display;

FIG. 13A shows an illustrative environment in which the release button is positioned on a rear of the secondary display;

FIG. 13B shows an illustrative environment in which a sliding element on the rear of the secondary display is in an opened and closed position;

FIG. 16 shows an illustrative diagram of the composition of the hinge on the primary display;

FIG. 29 is a simplified block diagram of an illustrative computing system that may be used in part to implement the present laptop with multi-display functionality.

Like reference numerals indicate like elements in the drawings. Elements are not drawn to scale unless otherwise indicated.

DETAILED DESCRIPTION

Figure 1:
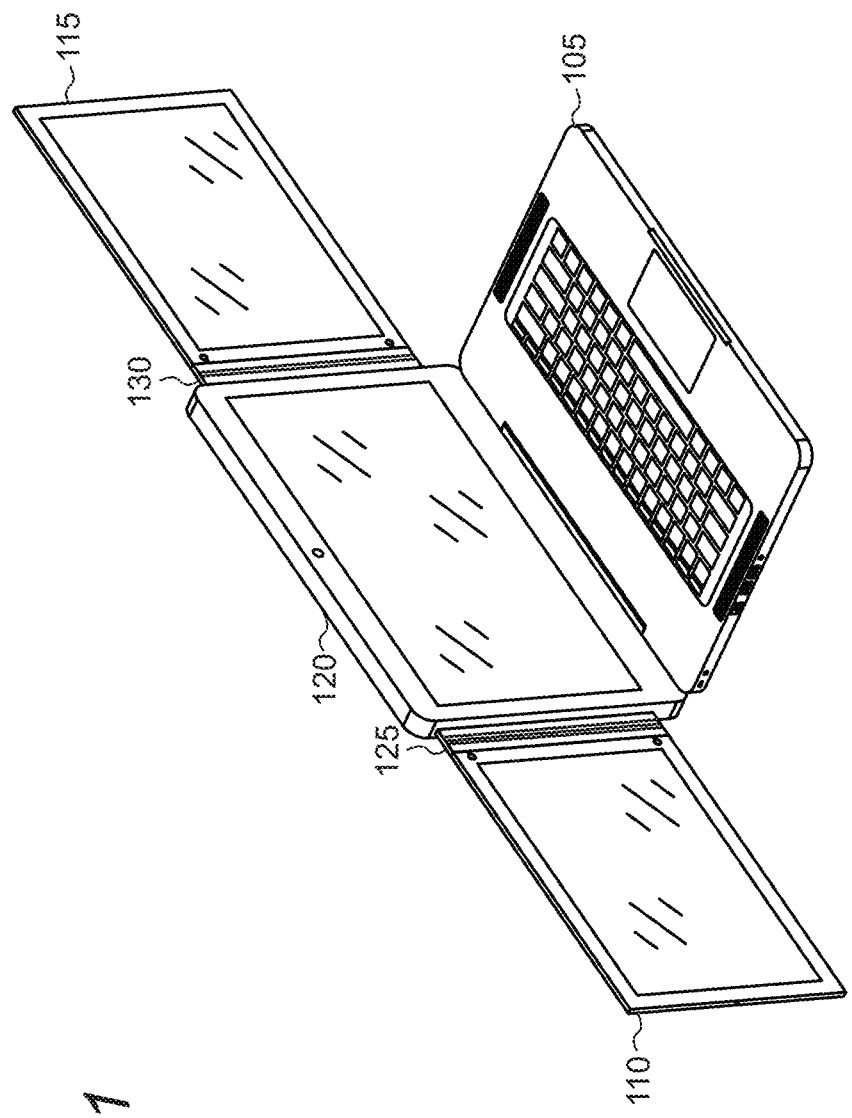
FIG. 1 shows an illustrative environment of a laptop computing device having a primary display and secondary displays extending laterally from opposing sides of the computing device.
Figure 2:
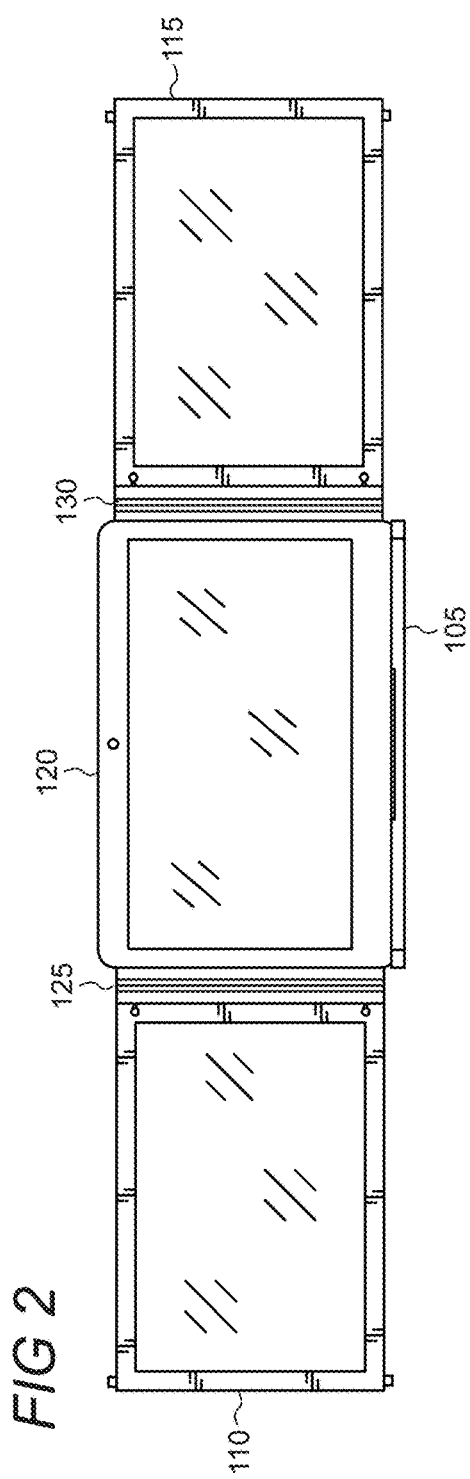
FIG. 2 shows the computing device with secondary displays from a front view.
Figure 3:
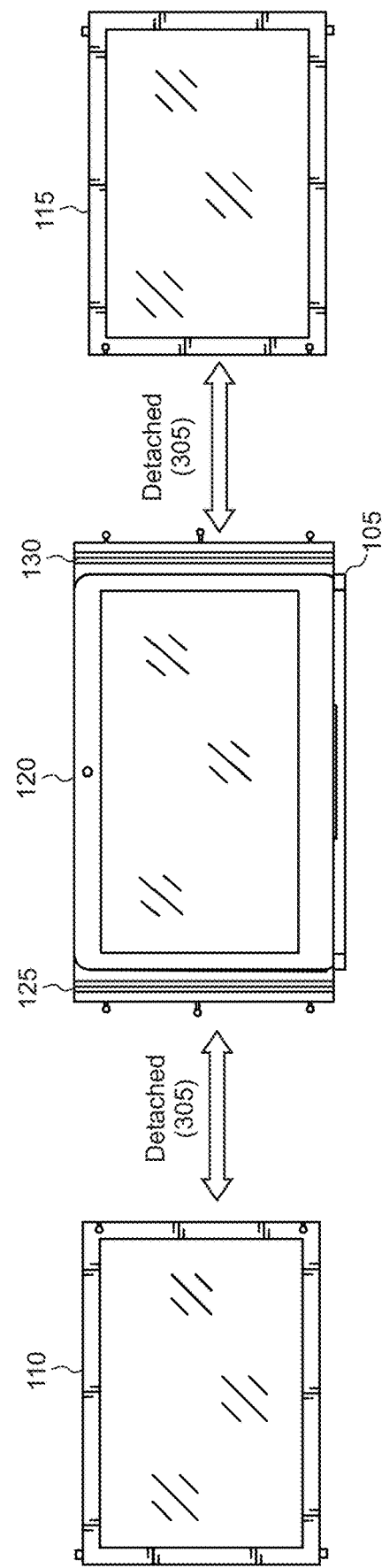
FIG. 3 shows an illustrative environment in which the secondary displays are detached from the primary display of the computing device.

FIGS. 1-5 shows illustrative environments in which a primary display 120 of a computing device 105 can leverage one or more secondary displays 110, 115 which extend laterally from an internal cavity of the primary display to enhance user experiences. FIG. 3 illustratively shows the secondary displays 110, 115 being detached 305 from the primary display 120 to enable portability. For example, Bluetooth® or other short range communication protocols can be utilized by the secondary displays for communicating with the primary display. The detached secondary displays can be viewed by local parties when, for example, a user is giving a presentation. The local parties can view the secondary displays comfortably in their own personal space instead of sitting directly adjacent to the user.

Figure 4:
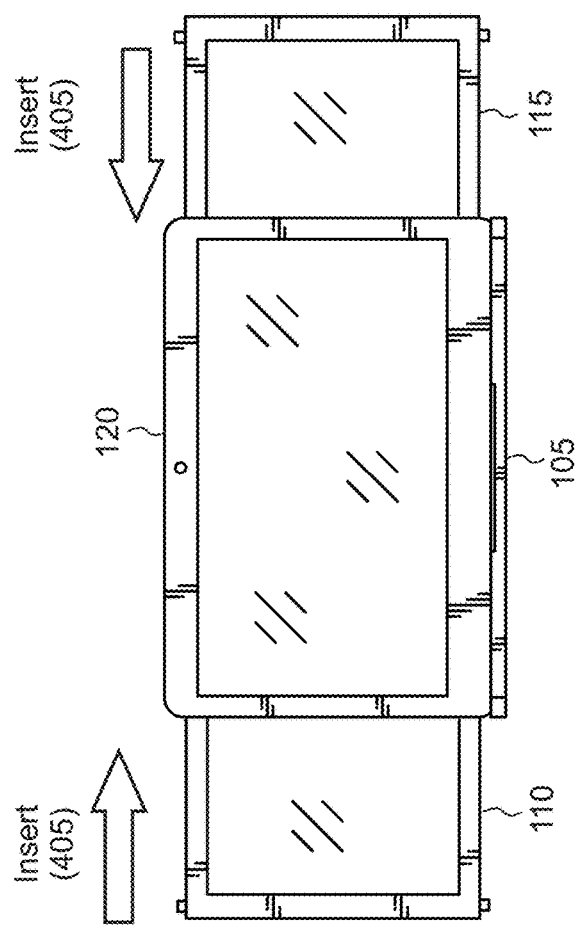
FIG. 4 shows an illustrative environment in which the secondary displays are inserted into an internal cavity of the computing device's primary display.
Figure 5:
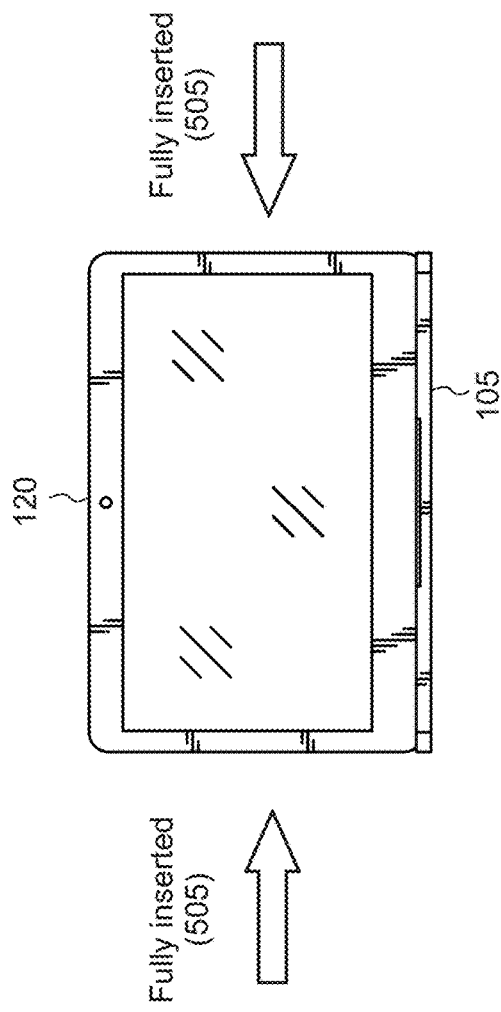
FIG. 5 shows an illustrative environment in which the secondary displays are fully inserted into internal cavity of the computing device's primary display.

FIGS. 4 and 5 show sequential environments in which the secondary displays 110, 115 are partially inserted 405 and then fully inserted 505 into the internal cavity of the primary display 120. The configuration of the computing device 105 provides users with the freedom to easily, conveniently, and compactly carry secondary displays and then enhance their computing environment by extending the secondary displays laterally from the primary display, as discussed in greater detail below. In typical implementations, the exposed sides of the secondary displays are substantially flush with the sides of the primary display for a sleek appearance.

Although depictions of a laptop computing device 105 is disclosed herein, the present implementations are also possible with other types of computing devices, such as tablet computers, display screens hooked up to personal computer (PC) towers, smartphones, etc. In other implementations, the sizing of the implemented secondary displays and other components may be adjusted to accommodate the smaller or larger form factor for the given computing device. Furthermore, while laterally extending secondary displays are depicted, other extensions are also possible such as additionally or alternatively extending the secondary display vertically upward from the primary display.

FIGS. 6A-C show illustrative diagrams of the tracks (or channels) 605, 610 inside the internal cavity of the computing device's primary display 120. The tracks enable two secondary displays 110, 115 to sit adjacent to each other and behind the primary display 120 of the computing device 105 for storage and protection. The hinge 125, which would be connected to the secondary display (FIGS. 1-3), slides along a respective set of tracks until a lip 670, 685 encounters a respective stop 680, 690 of the tracks 605, 695 which prevents the hinge from releasing from the tracks of the primary display, as shown in FIG. 6C. A similar system is implemented on an upper part of the hinge. This hinge mechanism and track structure may be similarly implemented for each set of tracks within the primary display. The primary display includes two sets of tracks, a top and bottom set, for a total of four tracks within the primary display's internal cavity. FIGS. 6A-B also depict respective spring mechanisms 650, 655 and locking pin holes 615, 660. The spring mechanism pushes the secondary display outward when the locking pins are disengaged with the locking holes, as discussed below with respect to FIGS. 7A-B.

Figure 7A:
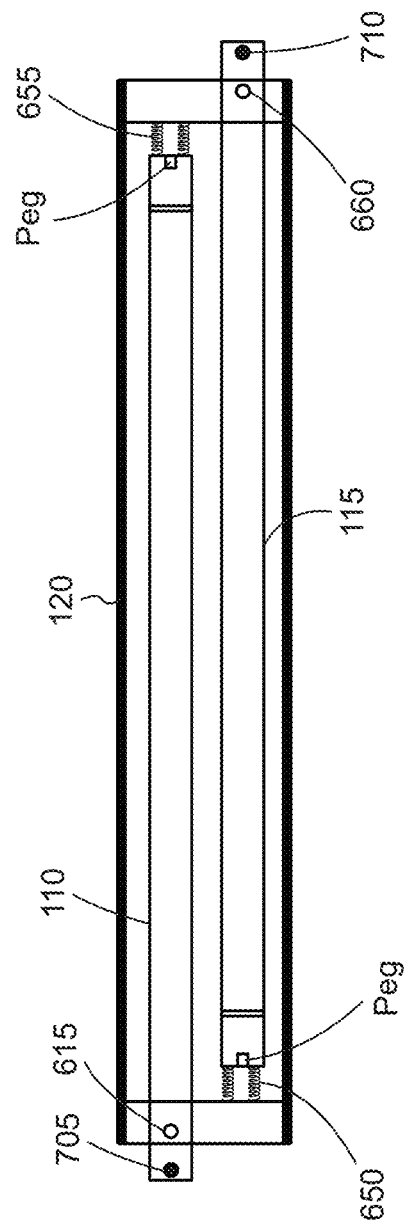
Figure 7B:
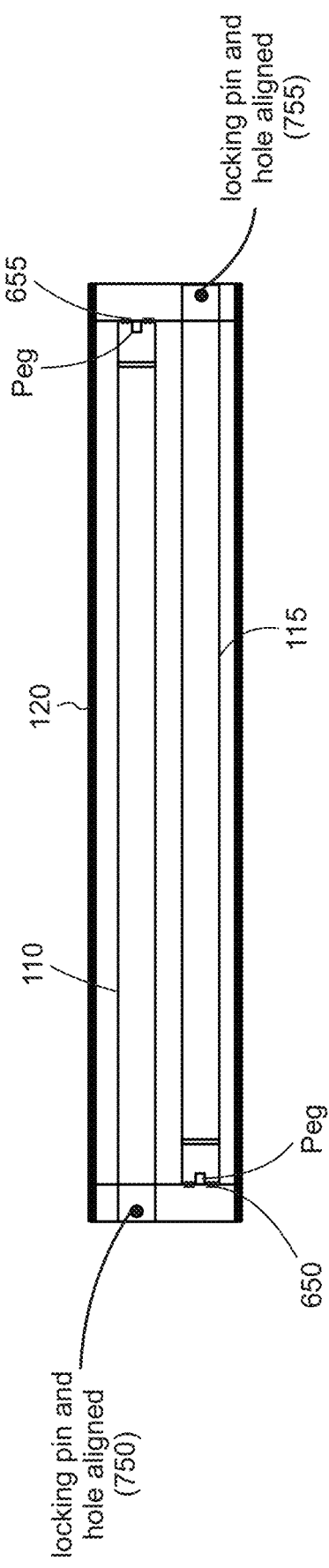

FIGS. 7A-B show illustrative environments in which locking pins 705, 710 respectively on the secondary displays 110, 115 lock into corresponding locking pin holes 615, 660 inside the casing of the primary display 120 to secure the enclosed secondary displays in place. FIG. 7A shows the locking pins and locking pin holes in corresponding locations before the secondary displays are fully inserted into the primary display. FIG. 7B shows the full alignment of the locking pin and hole, in which the locking pin enters and engages with the female part of the locking pin hole to lock the secondary displays to the primary display. The springs 650 and 655 are depicted as being expanded and compressed as the secondary displays are further pushed into the primary display casing.

FIG. 7C illustratively shows a base 780 of the primary display's internal cavity without secondary displays for clarity in exposition. The base of the primary display includes internal charging equipment 790 which is used to charge the secondary displays when fully inserted and locked into position of the primary display. In typical implementations, the internal charging equipment is positioned underneath the tracks on which the secondary displays slide and operates using wireless charging technology. For example, the internal charging equipment may transfer energy to a receiver on each secondary display via electromagnetic induction, in which the charger generates an alternating electromagnetic field which the receiver on the secondary display converts back into electricity form for charging its battery. Other charging mechanisms are also possible. For example, a bottom of the secondary displays may have electrical contacts that touch corresponding pins inside the primary display which thereby transfers electricity for charging. When the secondary displays are in use and outside of the primary display's casing, a wired connection can plug into ports on each secondary display (not shown), such as via universal serial bus (USB), AC (alternating current), etc.

Figure 8A:
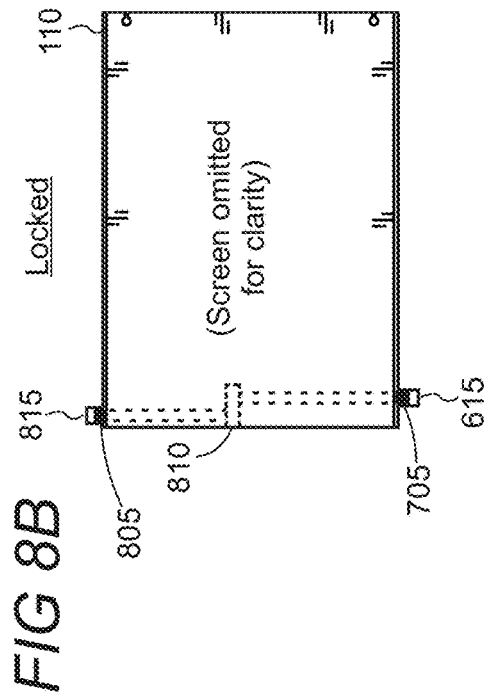
FIGS. 8A-B show illustrative environments of the locking mechanism on the primary and secondary displays.
Figure 8B:
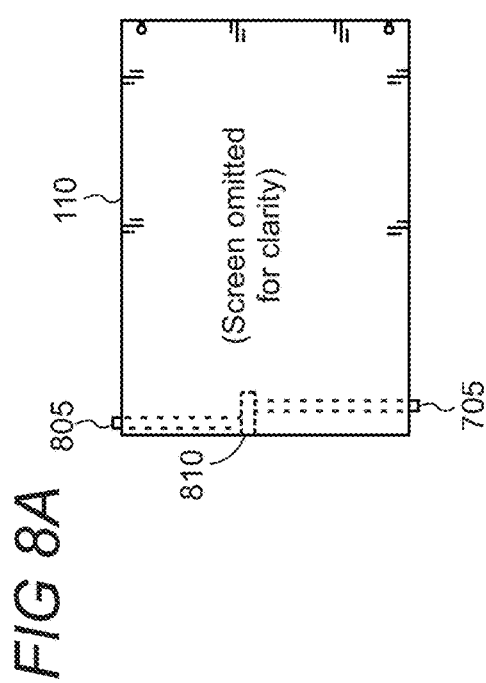

FIG. 8A shows an environment in which the locking pins 705 and 805 are in a lock position on the secondary display 110. A screen release button 810 on the side of the secondary display is connected to a locking mechanism inside the secondary display which causes the locking pins to compress inside the secondary display and disengage from the locking pin holes (FIGS. 7A-C) when in a locked position. For example, FIG. 8B shows the locking pins 705, 805 each engaged with and locked into place inside the primary display 120 of the computing device 105.

Figure 9A:
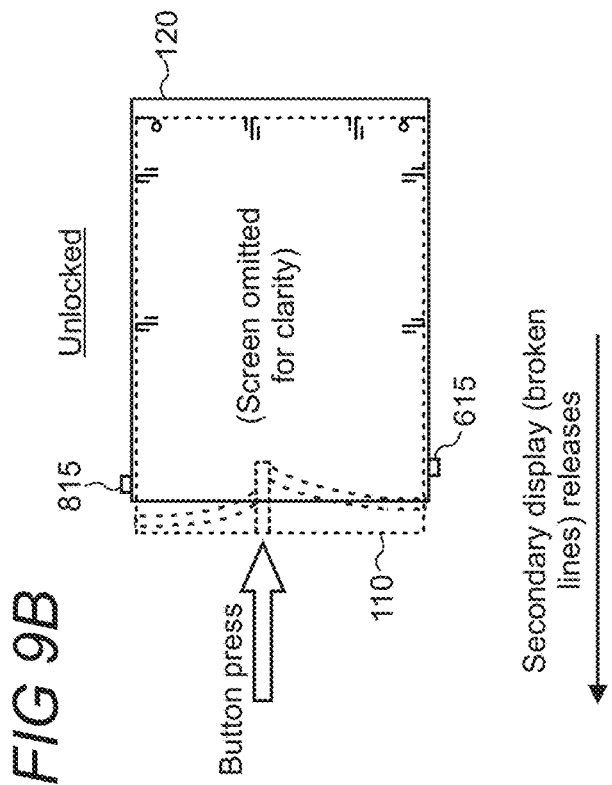
FIG. 9A-B show illustrative environments of the locking mechanism on the primary and secondary displays when the release button is pressed.
Figure 9B:
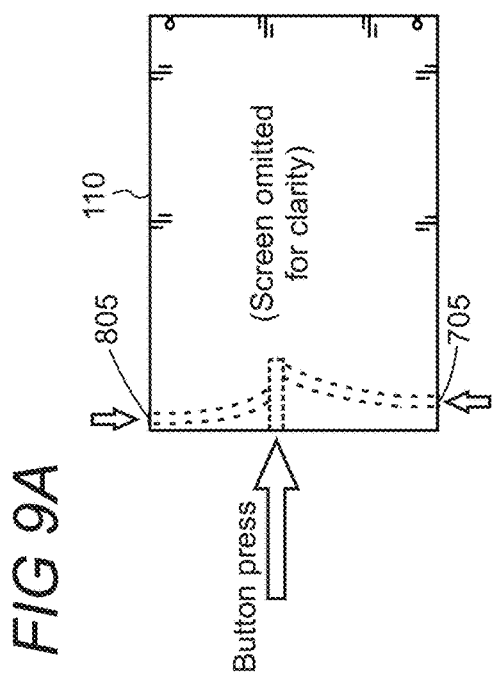

FIG. 9A shows an illustration in which a user manually presses the screen release button 810 which causes the locking pins 705, 805 to compress and thereby unlock from the primary display. The locking pins are connected to the screen release button which causes the locking pins to respectively move inward toward a center of the secondary display and thereby the outside locking pins to move inward to the secondary display. The locking pins may be connected to the internal portion of the screen release button via an adhesive, welded to each other, among other types of connections. The top locking pin moves downward and the bottom locking pin moves upward, as shown in FIGS. 9A-B. The secondary display disengages with the locking pin holes 615, 815, which thereby causes the secondary display to release from the primary display for use. The spring mechanism 650 (FIGS. 7A-B) pushes the secondary display outward when the locking pins disengage. Depending on the implementation, the spring mechanisms may push the secondary display partially or fully out of the primary display.

Figure 11:
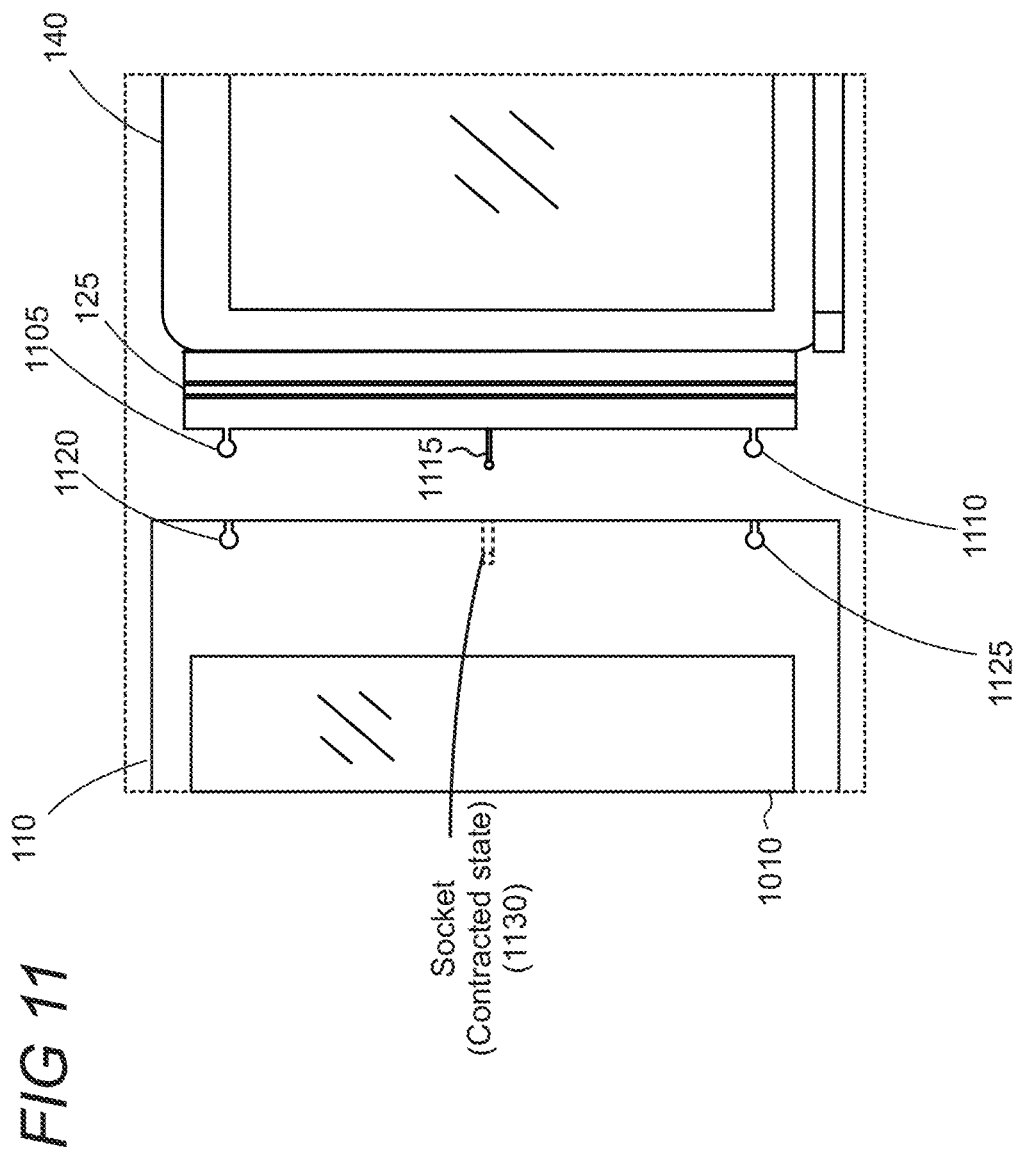
FIG. 11 shows an illustrative diagram in which an internal female socket for the center pin on the primary display is in a contracted state.

FIG. 10 shows an illustrative environment in which the hinge 125 on the computing device's primary display 120 is utilized to connect and enable movement of the secondary display 110. In this example, the right secondary display 115, if available, is still inserted inside the internal cavity of the primary display. Portion 1010 is shown in FIG. 11 for clarity in exposition. Unless otherwise stated, the drawings may not be drawn to scale.

FIG. 11 shows an illustrative top peg 1105, bottom peg 1110, and center pin 1115 which extend from the primary display 120 of the computing device 105 and which engage and interact with corresponding openings on the secondary display 110. Top peg 1105 inserts into a top side opening 1120 on the secondary display and the bottom peg likewise inserts into a bottom side opening on the secondary display. Openings 1120 and 1125 extend from a front to the rear of the secondary display 110 to enable rotational movement about center pin 115 while inserted into a central receiving socket 1130 of the secondary display. That is, the pegs 1105, 1110 can respectively be aligned with the openings 1120, 1125 while the center pin 1115 is inserted and locked in the central socket 1130, thereby enabling the 360° rotational movement of the secondary display. To insert the pegs into the openings, the secondary display may be off-centered while the center pin plugs into the central socket, and then the user rotates the secondary display to position it within the peg openings. FIG. 11 shows the central socket 1130 in a contracted state so the secondary display is secured in place while in use, to reduce the possibility of accidental removal while in use, and to enable the rotational movement of the secondary display.

Figure 12:
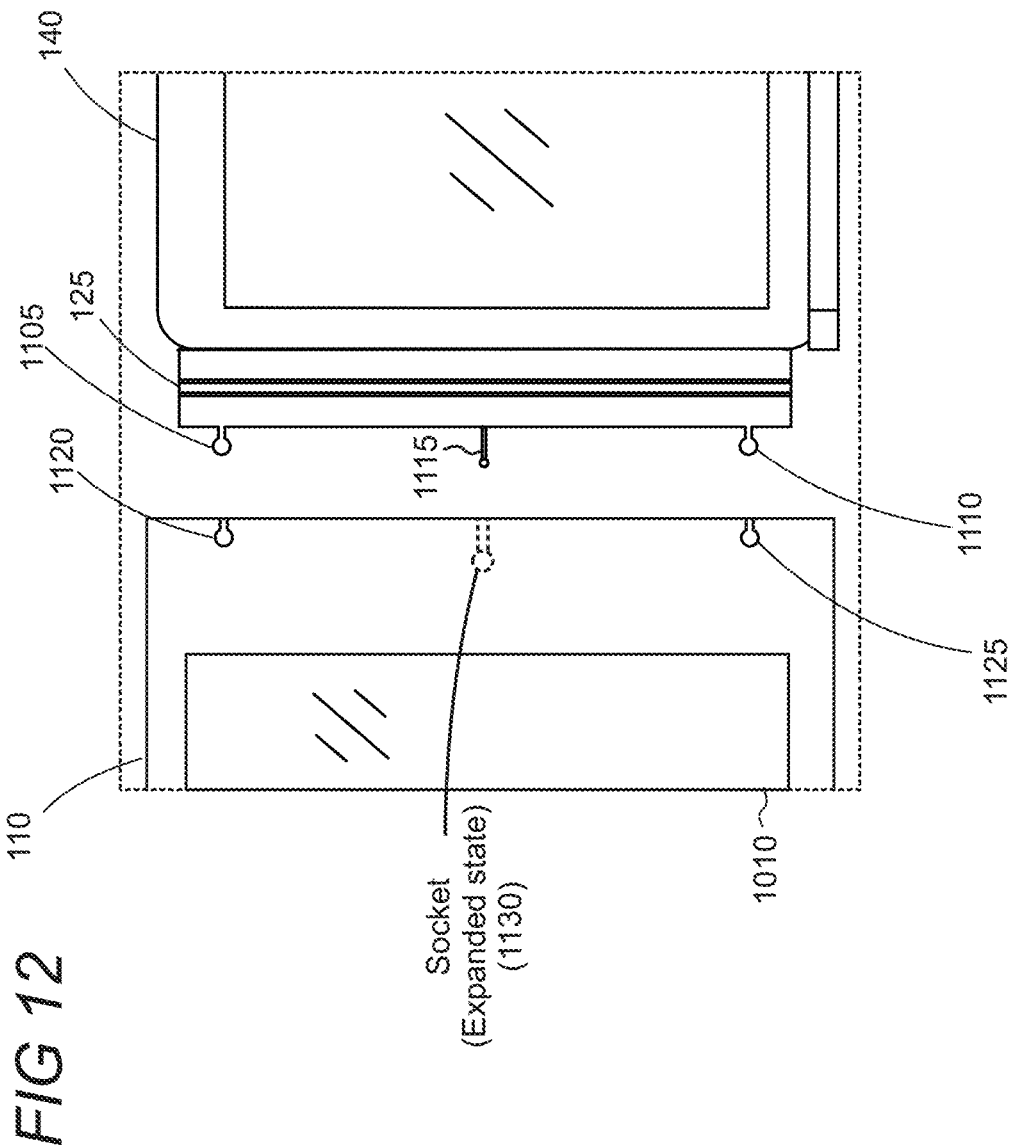
FIG. 12 shows an illustrative diagram in which the internal female socket for the center pin on the primary display is in an expanded state.

FIG. 12 shows the central socket 1130 in an expanded state responsive to a user pressing a screen release button 1305 as shown in FIG. 13A. Pressing the button causes the socket to expand which enables the ball portion of the center pin 1115 to release from the socket. Upon pressing the screen release button and pushing the sliding elements 1215, 1225 along their tracks to the cut-out portion 1210, 1220, the user can remove the secondary display altogether, or re-position it about 360° by twisting the display. While male pegs with female sockets are depicted in FIGS. 11 and 12, other connection mechanisms between the hinge on the primary display and the secondary display are also possible, such as other forms of press-fit, tab and notch, and other mechanisms strong enough to withstand the weight of the secondary display.

FIG. 13B illustratively shows the sliding element in the closed position and then slid over to the right in the opened position, as representatively shown by numeral 1350. The bottom opening 1125 (FIGS. 11 and 12) is exposed when the user slides the sliding element into the opened position. If the bottom peg 1110 was inserted into the secondary display, then that would likewise be shown. The sliding element includes the diagonal grip lines to provide easier gripping for manipulation by the user. When the sliding elements are in the closed position, the secondary display cannot rotate because the inserted pegs are blocked. Opening the top peg enables the user to move the secondary display backward (i.e., push away from the user), and opening the bottom peg enables the user to pull the secondary display toward the user. The sliding elements prevent the secondary display from inadvertently moving.

Figure 15:
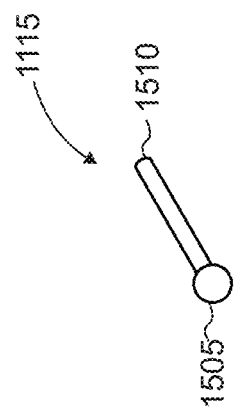
FIG. 15 shows an illustrative diagram of the center pin having a ball and shaft.
Figure 14:
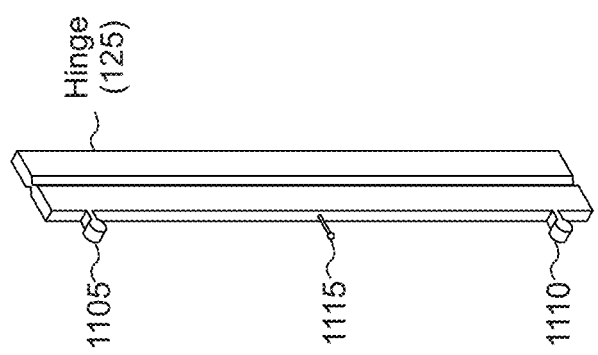
FIG. 14 shows an illustrative diagram of the pegs and center pin on the hinge of the primary display.

FIG. 14 shows an illustrative diagram of the hinge 125 and the shape of the top peg 1105, bottom peg 1110, and center pin 1115. A central portion of the hinge includes a v-shape on each back side to enable the hinge to move back and forth (e.g., toward a user and away from the user). FIG. 15 shows the center pin 1115 having a ball 1505 which fits evenly into a corresponding ball-shaped opening on the secondary display to enable rotational movements. The ball 1505 is connected to a shaft 1510 which is directly attached to the hinge 125.

FIG. 16 shows an illustrative diagram of the composition of the hinge 125. While an outside of the hinge shows a single piece, it is comprised of at least three layers for support and bendability. Durable support layers 1615, 1610 are positioned on the secondary display 110 side and the computing device 105 sides of the hinge to provide sufficient support to both devices. The durable support layers may include a metal material such as titanium, copper, and the like. In the center of the hinge is a thin layer 1605 (e.g., plastic, thin metal) which is capable of bending to provide even greater positioning customization of the secondary display. For example, the implementation of the hinge enables a user to pull the secondary display forward and push it backward about the hinge, in addition to providing 360° rotational movement as discussed above. The right side of the hinge that is depicted in grey represents the portion that is inside the primary display and its lips 670, 685 prevent the hinge from completely releasing from the primary display's tracks (FIG. 6C). Other depictions may not show this portion of the hinge since it is typically unseen by an observer. This representation of the hinge is not drawn to scale and is made for clarity in exposition.

Figure 17:
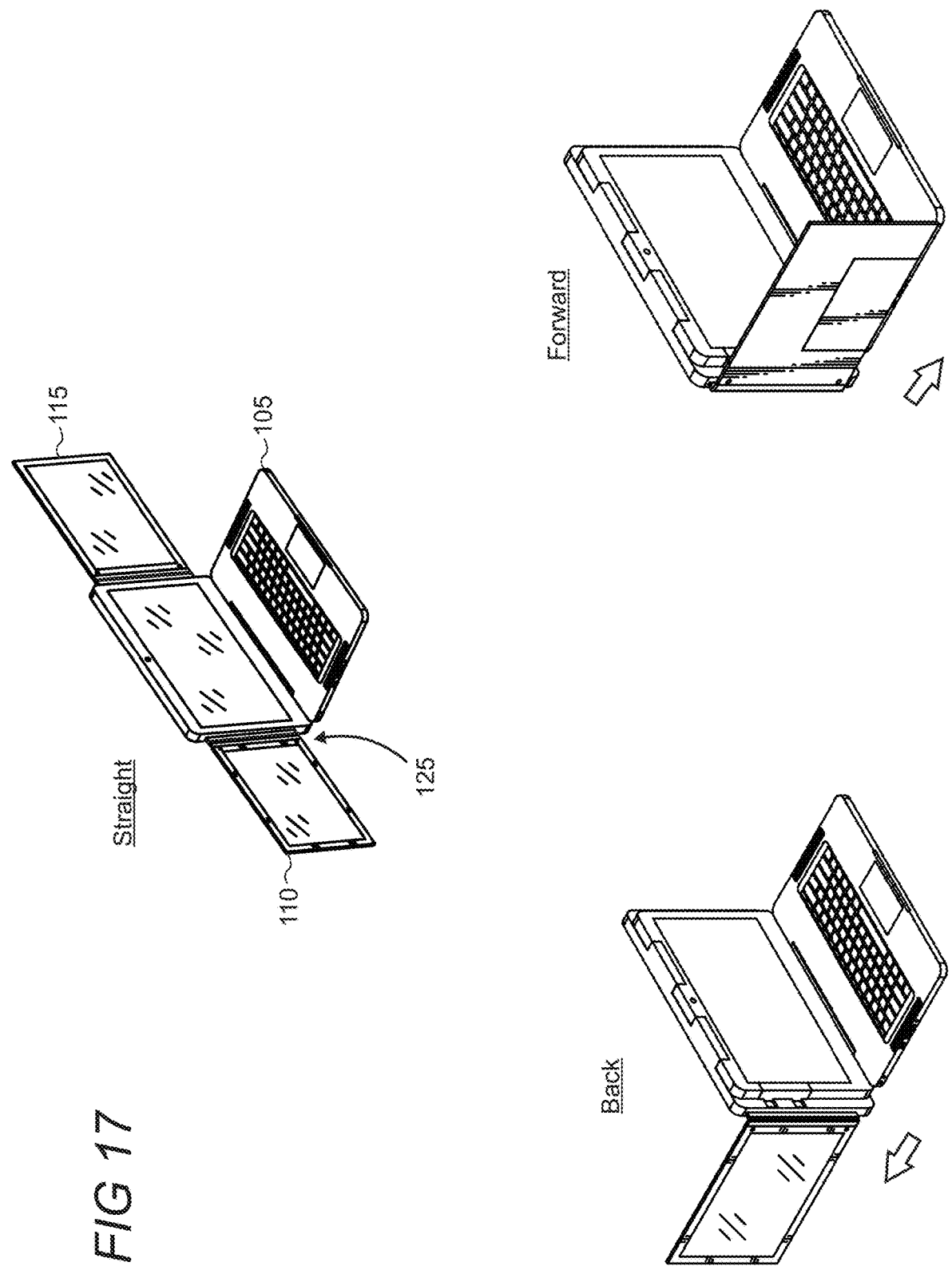
FIG. 17 shows an illustrative environment in which the secondary display is adapted to move forward and backward using the hinge.

FIG. 17 show an illustrative forward and backward movement of the secondary display as described above. The secondary display can be pushed back away from the user or forward toward the user depending on the user's desired set-up. This provides greater and seamless customization for the user's computing environment. The forward and backward movement of the secondary display can both be substantial depending on the implementation, including bending up to and beyond 90° such that the display is virtually perpendicular to the conventional extended position. The makeup of the hinge's central thin layer portion is adapted to stop at any point the user places the secondary display.

Figure 18:
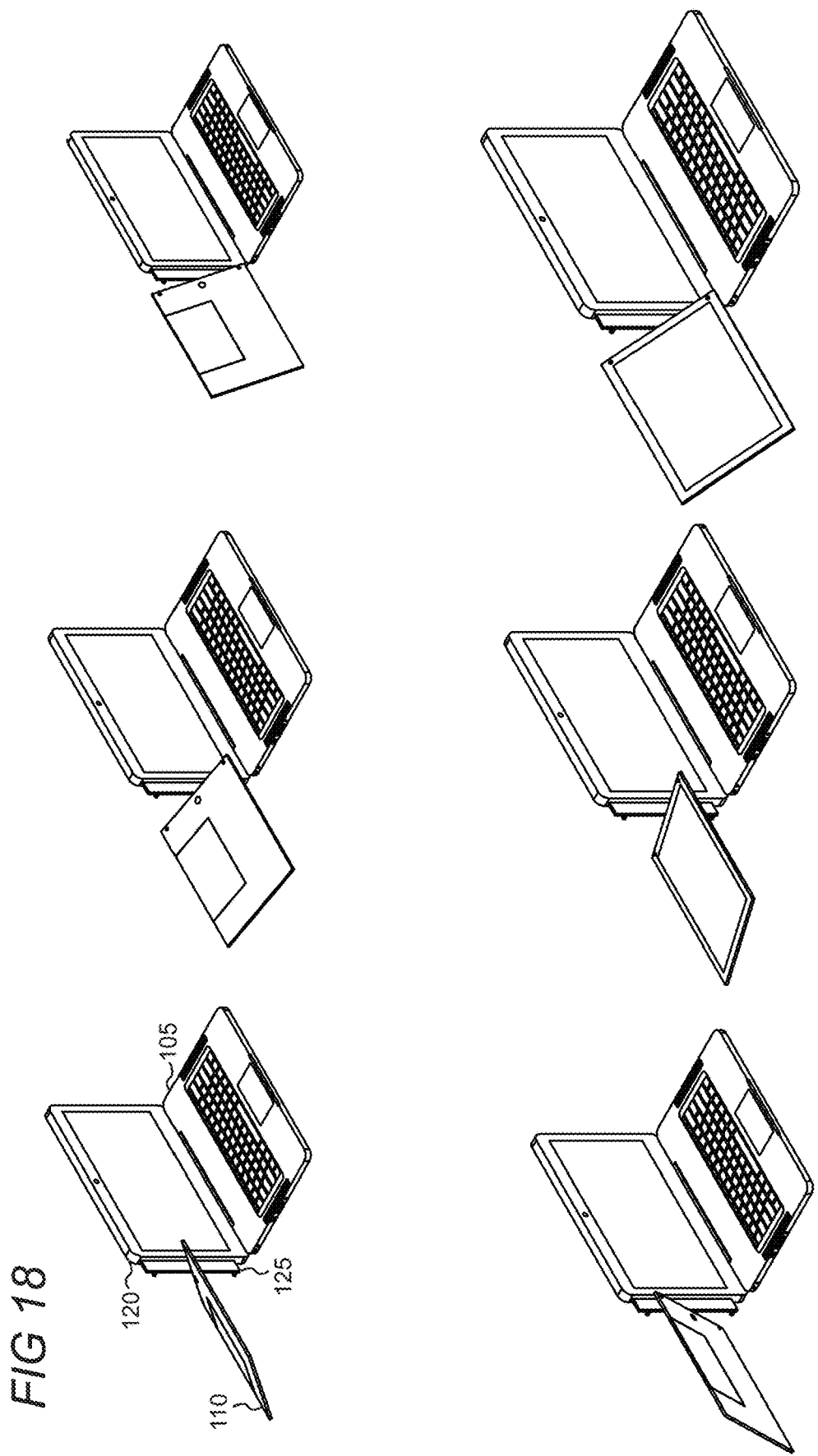
FIG. 18 shows an illustrative environment in which the secondary display is adapted to rotate 360° about the center pin on the hinge.

FIG. 18 shows an illustrative progression of a 360° rotation of the secondary display about the hinge 125. The secondary display can move about 360° utilizing the male-female connection of the hinge system between the primary display and the secondary display. The progression in FIG. 18 moves from the top left to the top right, and then the bottom left to the bottom right. Although not shown, after the final drawing on the bottom right, the secondary display can re-connect to the hinge 125 upon finishing the 360° turn.

Figure 19:
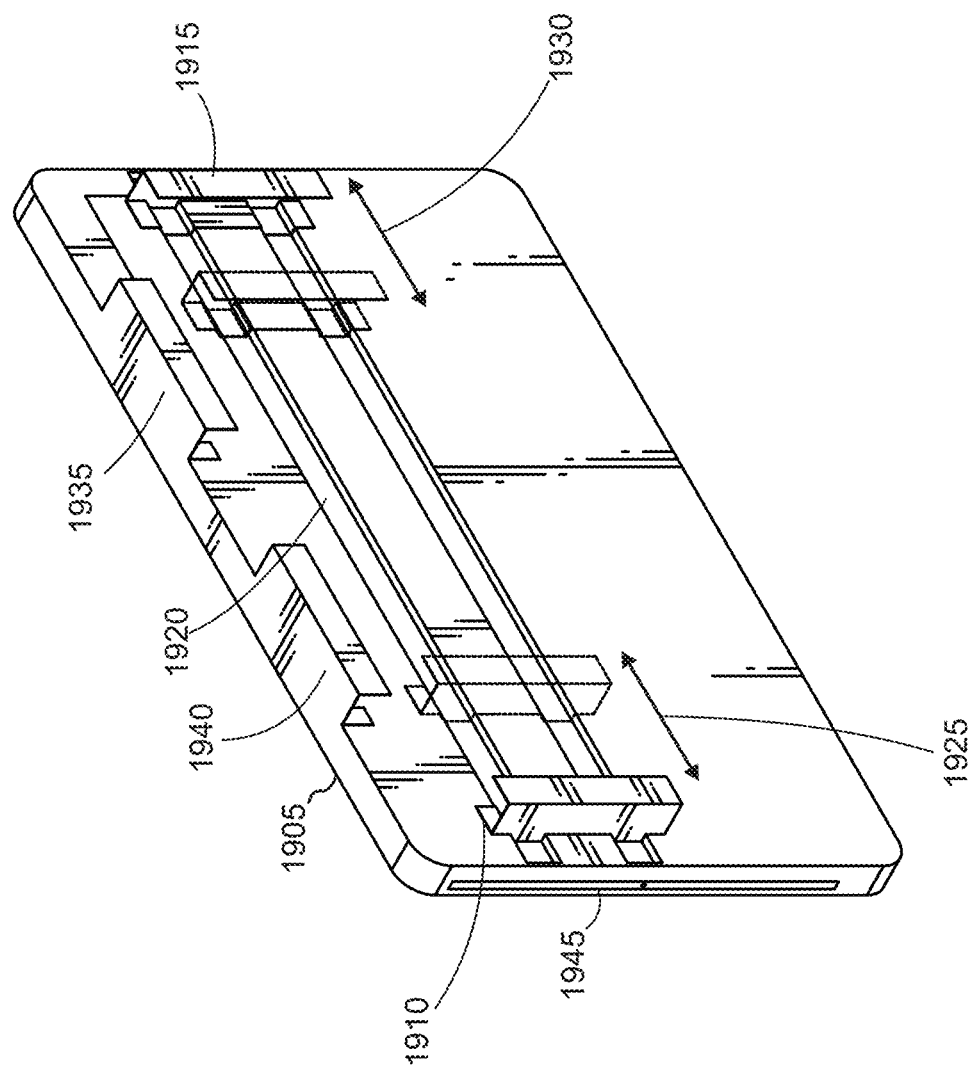
FIGS. 19-21 show illustrative environments of an add-on component which implements a portable alternative for releasing secondary displays for a standard laptop computer.
Figure 20:
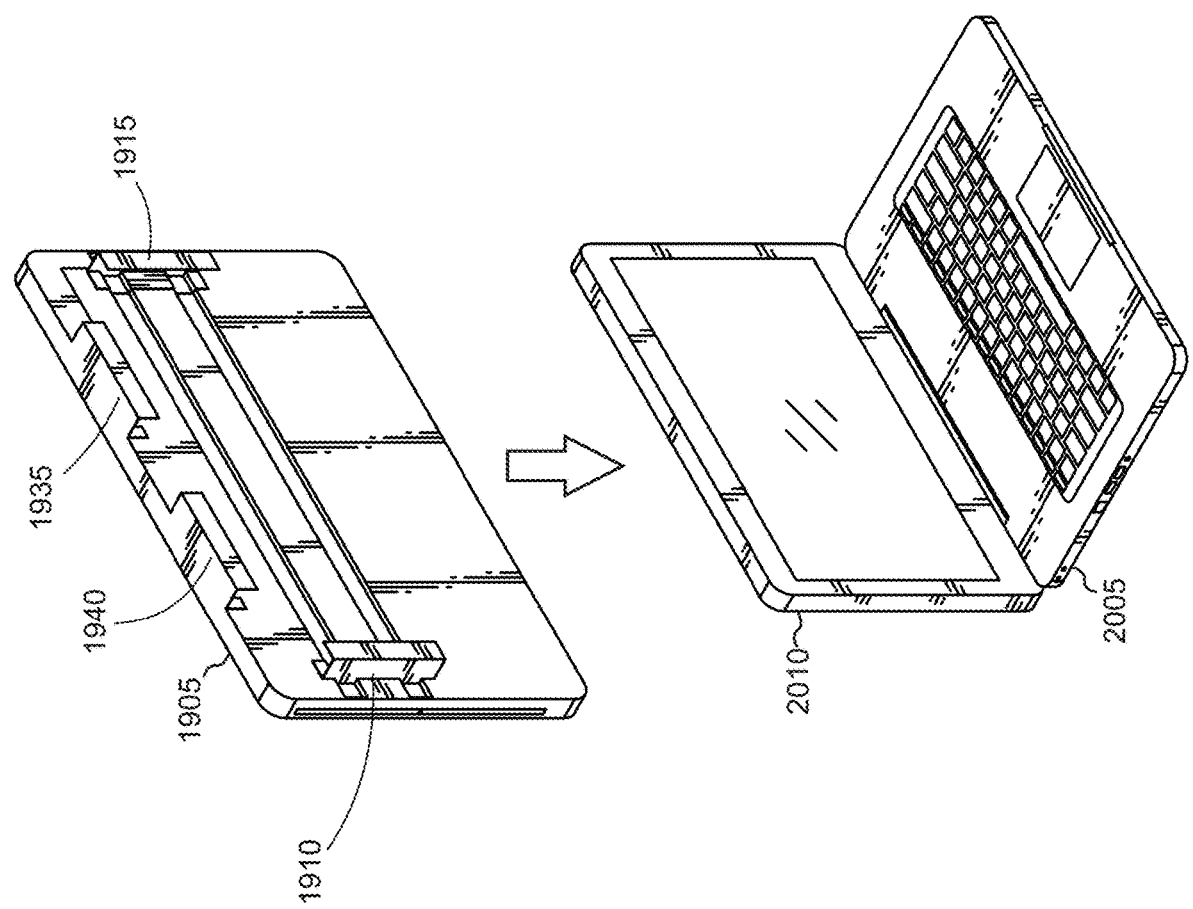
Figure 21:
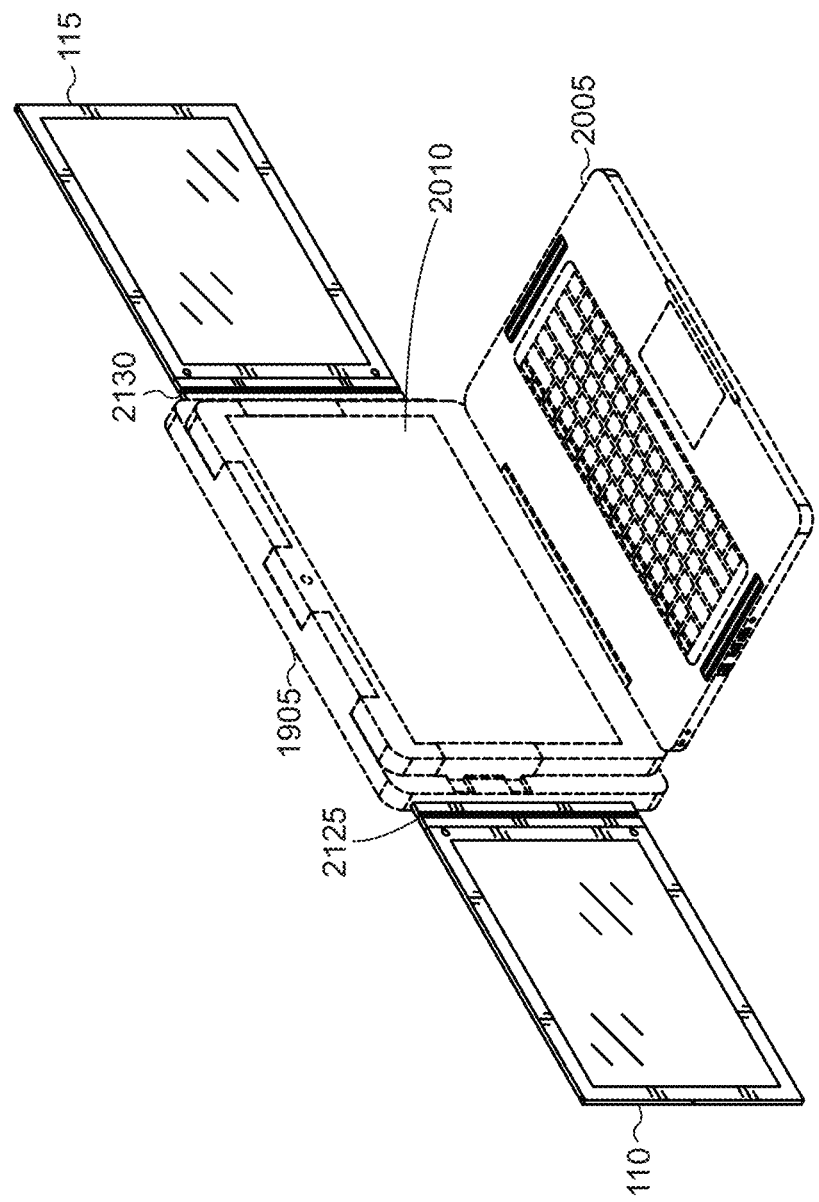

FIGS. 19-21 show illustrative environments in which an add-on component 1905 can be utilized to turn a standard computing device 2005 into a multi-display set-up. The add-on component includes upper arms 1935, 1940 which latch onto a top of a display portion 2010 of the device 2005. Opposing side arms 1910, 1915 slide along the sides of the display portion 2010. The side arms are configured to slide along tracks 1920 to enable the add-on component to latch onto laptops of varying sizes. That is, the opposing arms can move inward and outward to accommodate 17 inch, 15 inch, 13 inch, and other smaller sized laptops, as representatively shown by the double arrows 1925, 1930 in FIG. 19. The left secondary display can extend from opening 1945 and a right secondary display can likewise extend from an opening (not shown) on the opposite side of the add-on component, as depicted in FIG. 21. The add-on component is configured similarly to the primary display 120 of the computing device 105 described above, in which the add-on component includes tracks, locking holes and mechanisms, hinges 2125, 2130, etc. Thus, the add-on component provides an adaptable version of the computing device 105.

Figure 22:
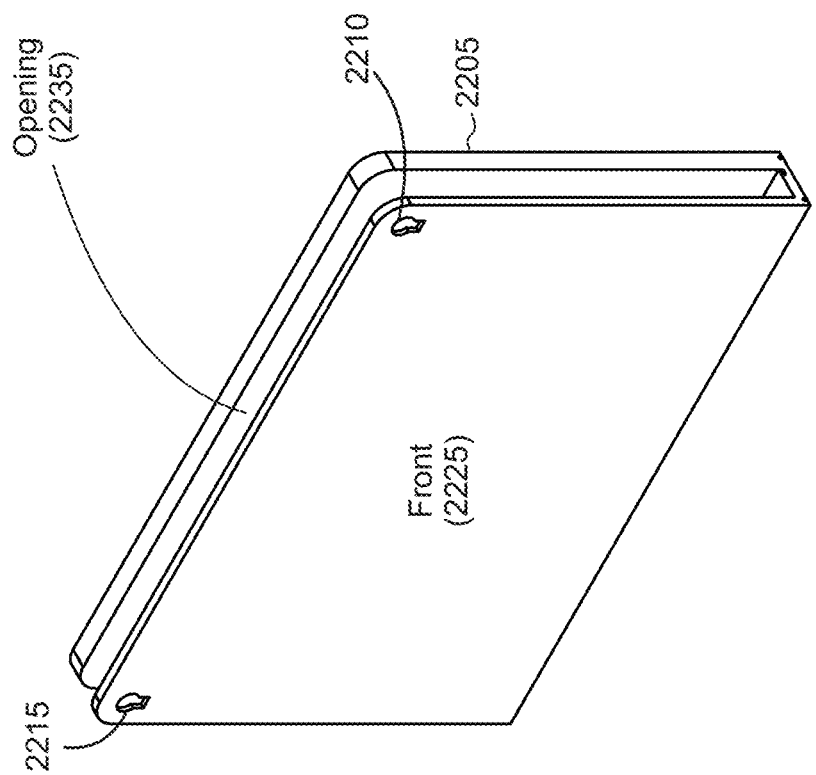
FIGS. 22-24 show illustrative environments in which a stand can be used with the add-on component.
Figure 23:
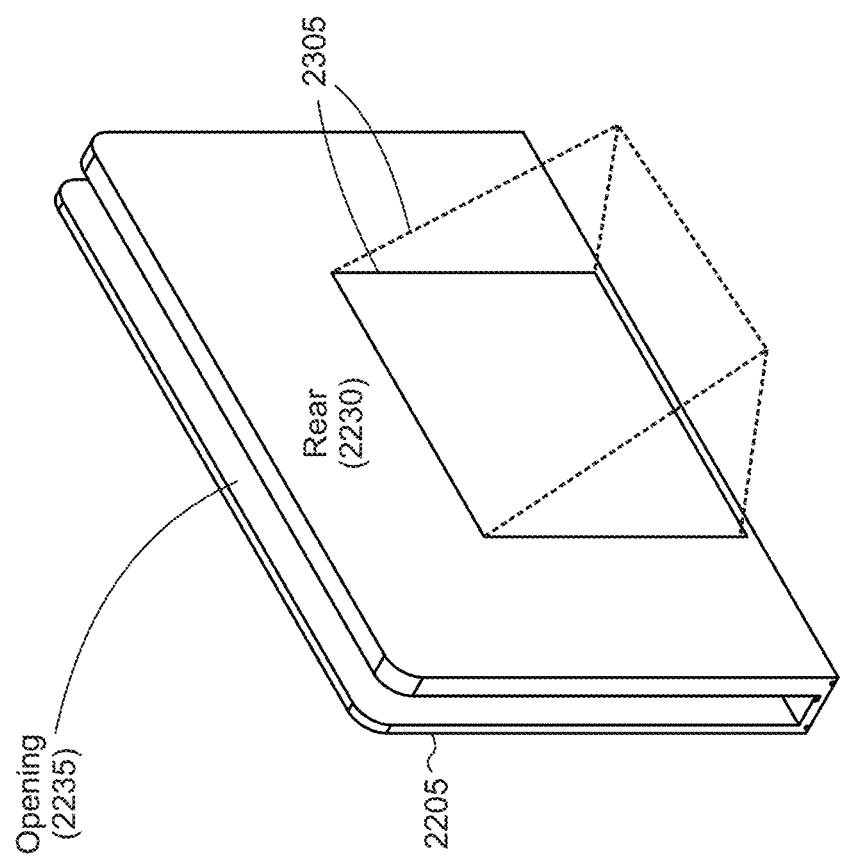
Figure 24:
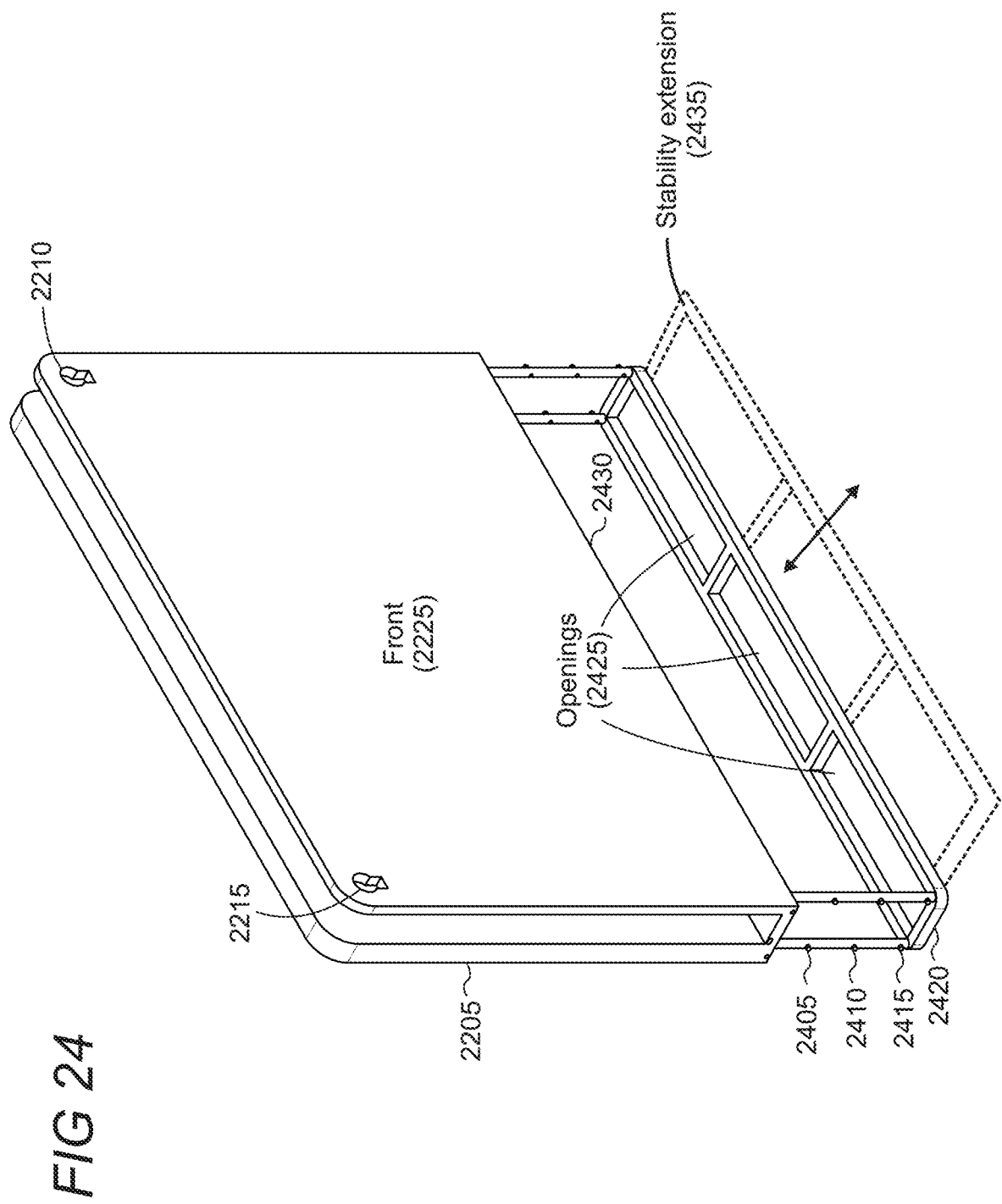

FIGS. 22-24 show illustrative diagrams of a stand 2205 to provide further customization and adaptability of the system disclosed herein. The front 2225 of the stand includes two female members 2210, 2215 which can receive a horizontal adapter to create a desktop user experience for a user. For example, the horizontal adapter can receive a flat screen display for viewing by a user. The add-on component with multi-display functionality inserts into the opening 2235 from which secondary displays extend. Accordingly, the stand 2205 turns the add-on component into a compact and portable desktop user experience.

FIG. 23 shows the rear 2230 of the stand 2205 which shows a kickstand 2305 in an opened (dashed lines) and closed position (solid lines). The kickstand can provide additional support for or enable a user to adjust the tilt of the stand 2205. In some use cases, laptops can be opened and leaned up against the front of the stand and, when the kickstand is opened, can give the appearance that the user's laptop and the stand are an all-in one system (i.e., the stand will not tip over). The possibility that the user will push the laptop's screen is more likely as touchscreens become more popular and prevalent.

FIG. 24 shows an illustrative environment in which the stand includes legs 2420 which extend from a base 2430 of the stand 2205. The legs include openings 2425 to enable a user to extend wires for plugging into any devices that are used with the stand, such as the horizontal adapter discussed below (FIG. 26). The stand has multiple levels at which it could extend as shown by the notches 2405, 2410, and 2415. The stand can rest at any one of the notches to provide greater user control over the setup of their computing environment. Inside of the stand has corresponding tabs that lock in at the notches (e.g., a friction fit set-up). Furthermore, a stability extension 2435 can extend (e.g., slide) from the base 2420 of the legs to provide increased stability to the stand. The stability extension may slide on tracks and may be inclined inward as the stability extension extends to enable the extension to exit and enter back into the tracks of the base.

Figure 25:
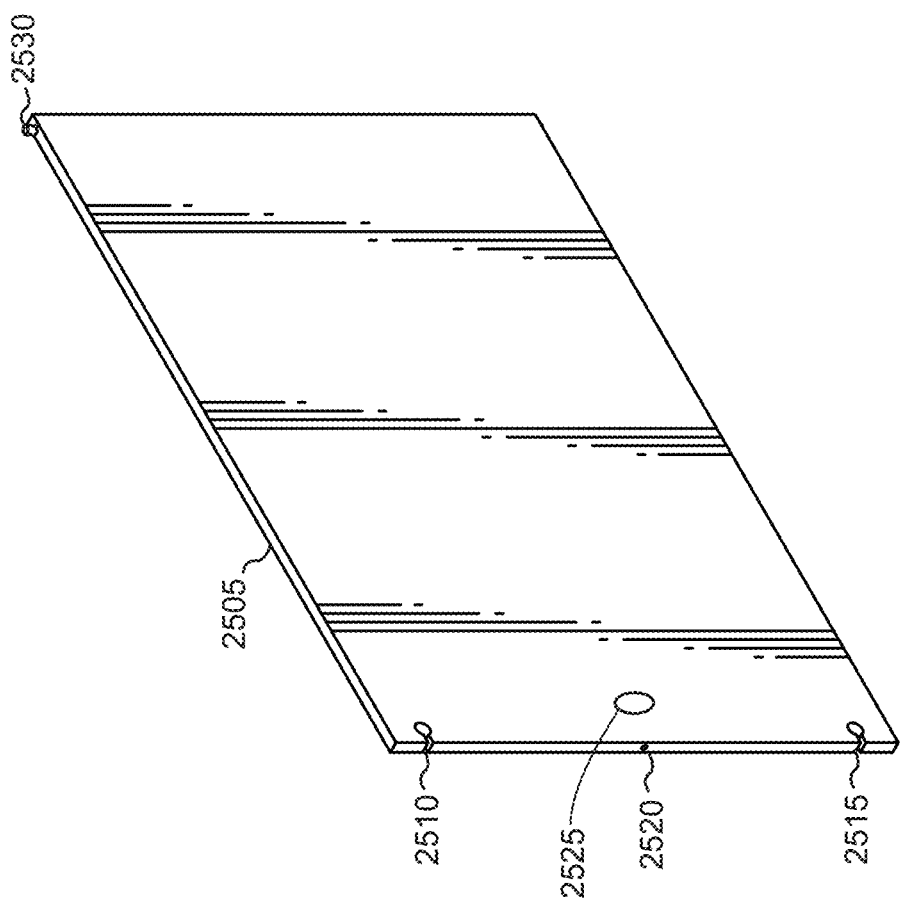
FIG. 25 shows an illustrative environment of an insert that can be inserted into the tracks of the primary display.

FIG. 25 shows an illustrative environment of an insert 2405 which can be inserted into the slots of the primary display as a replacement or placeholder to the secondary displays. The insert can be used to prevent dust and debris from forming inside the tracks and casing of the primary display. The insert fits inside the tracks and the opening of the primary display just as the secondary display would, and can be removed and switched out once a user obtains a suitable secondary display. The insert can have similar mechanisms to enable it to interact with the primary display and hinge. For example, the insert has top and bottom female openings 2510, 2515, respectively, to receive and mate with the top and bottom pegs on the hinge. The insert also has the center socket 2520 to enable the insert to rotate 360° about the center pin on the hinge. The insert has a locking pin 2530 to lock into the primary display and a screen release button (not shown) for removal of the insert.

Figure 26B:
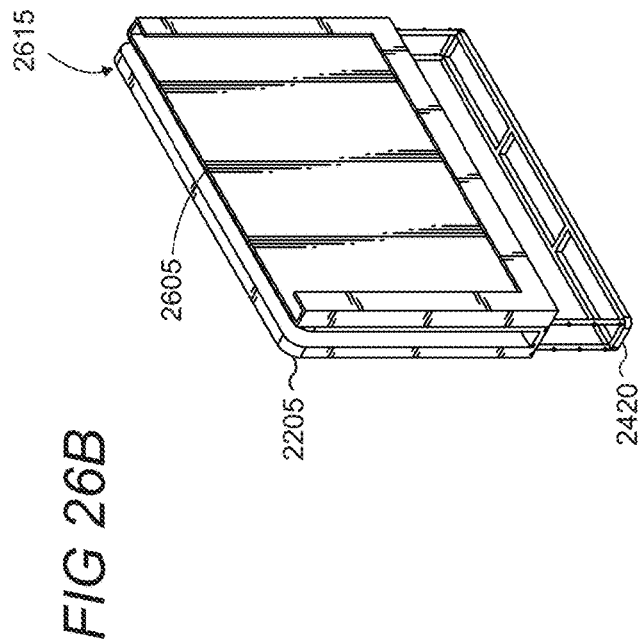
FIGS. 26A-C show an illustrative environments in which a horizontal attachment can be used as an accessory with the add-on component and the stand.
Figure 26C:
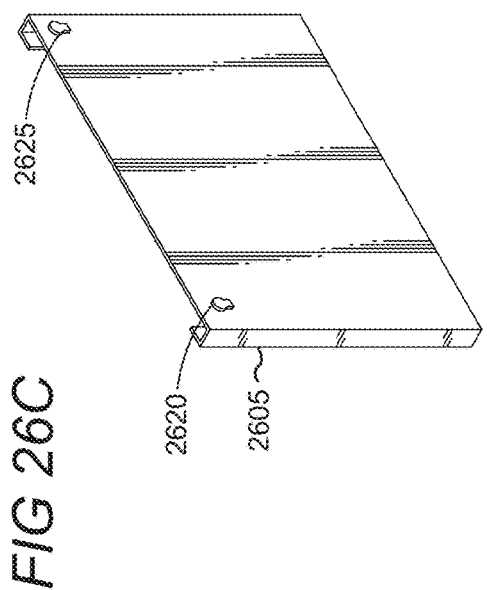
Figure 26A:
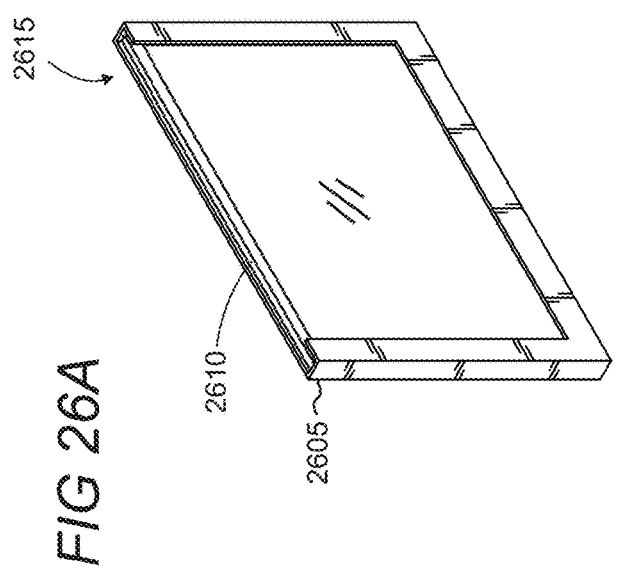

FIGS. 26A-C show illustrative environments in which a horizontal attachment 2605 that can be used with the stand 2205 to create a portable desktop-like environment. A triple-display setup can additionally be leveraged when the stand is utilized with the add-on component 1905. The horizontal attachment includes an opening 2615 inside which a display screen 2610 can be inserted. Tabs 2620, 2625 are positioned on a rear of the horizontal attachment and attach to the corresponding notches 2210, 2215 on the front of the stand (FIG. 24). In some embodiments, washers can be utilized with the tabs and notches to provide an improved fit. The horizontal attachment can be used with the stand and provides the user with a middle screen while the add-on component 1905 positioned inside the stand provides the user with the dual side display setup. The combination of the stand, add-on component, and horizontal attachment provides the user with an ecosystem of products that can provide a portable and convenient desktop-like experience.

Figure 27B:
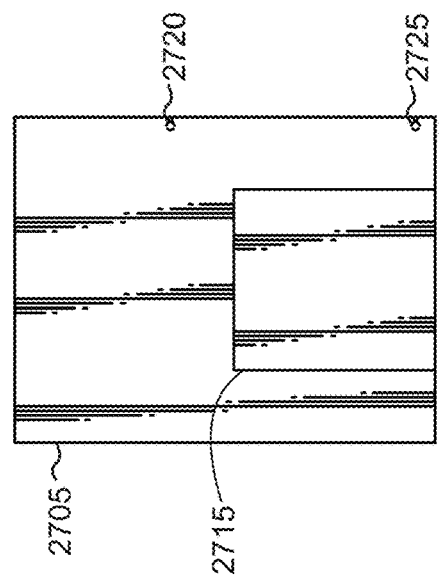
FIGS. 27A-B show illustrative environments in which a vertical display adapter can be used with the add-on component or primary display of the computing device.
Figure 27A:
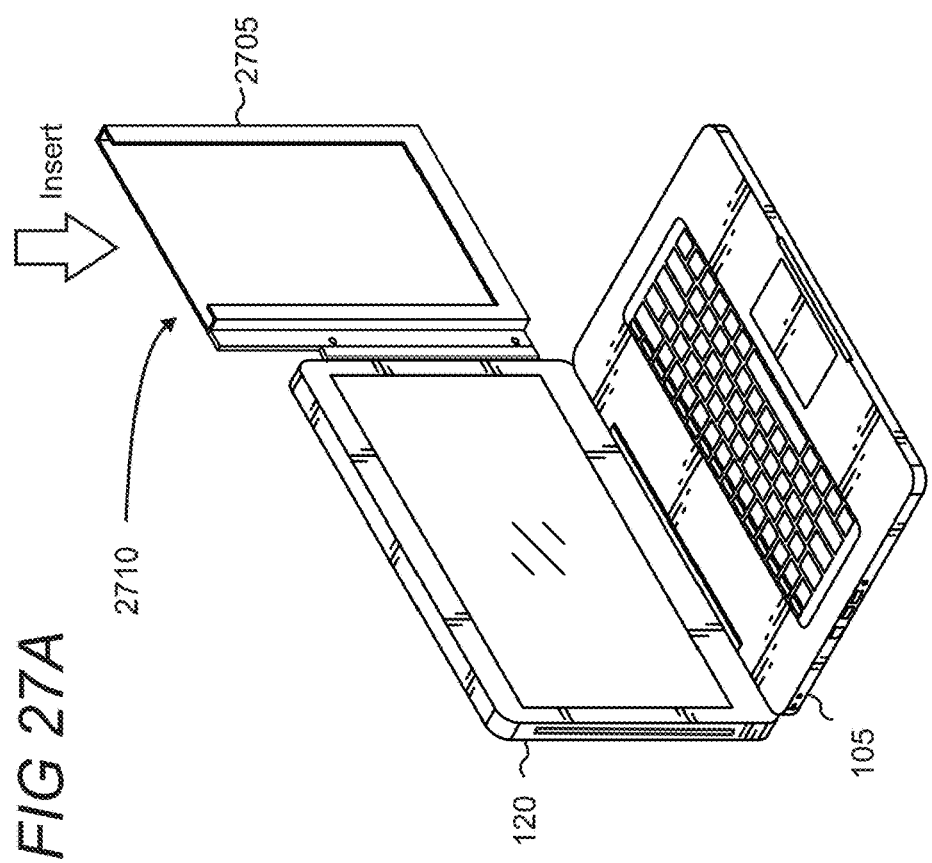

FIGS. 27A-B show illustrative environments in which a vertical screen adapter 2705 is used with the primary display 120 of the computing device 105. In other embodiments, the vertical screen adapter can be used with the add-on component depicted in FIGS. 19-21 as well (not shown). A secondary display screen can be inserted into the opening 2710 to provide the user with a vertical set-up in addition or as an alternative to the horizontal set-up (FIGS. 1-4). The vertical screen adapter leverages the same male-female connection system as discussed above with respect to FIGS. 10-16, thus enabling the vertical screen adapter to rotate and bend forward and backward as discussed above with respect to FIGS. 17 and 18.

The vertical screen adapter can detach (e.g., by manually pressing the screen release button on the rear of the adapter) from the hinge on the primary display and connect to an exposed hinge (not shown) on the opposite side of the computing device to enable a user to reverse the screen (i.e., show the screen away from the user). The vertical screen adapter is equipped with the peg openings 2720, 2725 for receiving the male pegs on the hinge and a female socket (not shown) for receiving the pin. The symmetric configuration of the male-female connectors provides a reversible capability for the system to provide even greater user customization. The vertical screen adapter 2705 can come with a stand 2715 that opens and closes to enable a user to detach the vertical display from the hinge and set it up on a table or platform. Since the display screens can function over Bluetooth® or a wired connection, detaching the horizontal or vertical oriented displays from the hinge is another available option to users.

Figure 28:
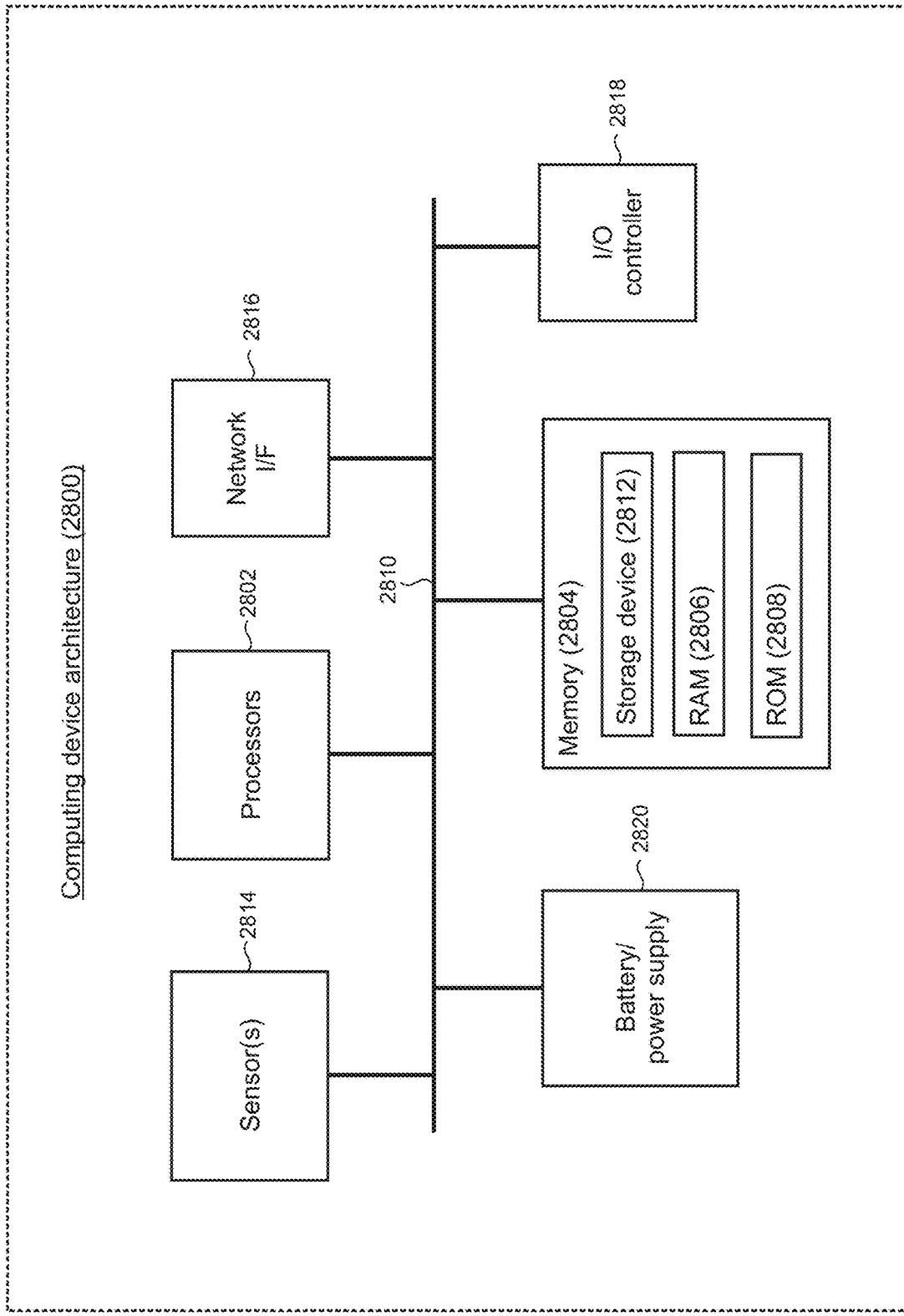
FIG. 28 is a simplified block diagram of an illustrative computer system that may be used in part to implement the present laptop with multi-display functionality.

FIG. 28 shows an illustrative architecture 2800 for a device, such as a smartphone or tablet, capable of executing the various components described herein for hinge mechanism for electronic devices. The architecture 2800 illustrated in FIG. 28 includes one or more processors 2802 (e.g., central processing unit, dedicated AI chip, graphics processing unit, etc.), a system memory 2804, including RAM (random access memory) 2806, ROM (read only memory) 2808, and long-term storage devices 2812. The system bus 2810 operatively and functionally couples the components in the architecture 2800. A basic input/output system containing the basic routines that help to transfer information between elements within the architecture 2800, such as during startup, is typically stored in the ROM 2808. The architecture 2800 further includes a long-term storage device 2812 for storing software code or other computer-executed code that is utilized to implement applications, the file system, and the operating system. The storage device 2812 is connected to the processor 2802 through a storage controller (not shown) connected to the bus 2810. The storage device 2812 and its associated computer-readable storage media provide non-volatile storage for the architecture 2800. Although the description of computer-readable storage media contained herein refers to a long-term storage device, such as a hard disk or CD-ROM drive, it may be appreciated by those skilled in the art that computer-readable storage media can be any available storage media that can be accessed by the architecture 2800, including solid stage drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2800.

According to various embodiments, the architecture 2800 may operate in a networked environment using logical connections to remote computers through a network. The architecture 2800 may connect to the network through a network interface unit 2816 connected to the bus 2810. It may be appreciated that the network interface unit 2816 also may be utilized to connect to other types of networks and remote computer systems. The architecture 2800 also may include an input/output controller 2818 for receiving and processing input from a number of other devices, including a keyboard, mouse, touchpad, touchscreen, control devices such as buttons and switches or electronic stylus (not shown in FIG. 28). Similarly, the input/output controller 2818 may provide output to a display screen, user interface, a printer, or other type of output device (also not shown in FIG. 28).

It may be appreciated that any software components described herein may, when loaded into the processor 2802 and executed, transform the processor 2802 and the overall architecture 2800 from a general-purpose computing system into a special-purpose computing system customized to facilitate the functionality presented herein. The processor 2802 may be constructed from any number of transistors or other discrete circuit elements, which may individually or collectively assume any number of states. More specifically, the processor 2802 may operate as a finite-state machine, in response to executable instructions contained within the software modules disclosed herein. These computer-executable instructions may transform the processor 2802 by specifying how the processor 2802 transitions between states, thereby transforming the transistors or other discrete hardware elements constituting the processor 2802.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2800 in order to store and execute the software components presented herein. It also may be appreciated that the architecture 2800 may include other types of computing devices, including wearable devices, handheld computers, embedded computer systems, smartphones, PDAs, and other types of computing devices known to those skilled in the art. It is also contemplated that the architecture 2800 may not include all of the components shown in FIG. 28, may include other components that are not explicitly shown in FIG. 28, or may utilize an architecture completely different from that shown in FIG. 28.

FIG. 29 is a simplified block diagram of an illustrative computer system 2900 such as a smartphone, tablet computer, laptop computer, or personal computer (PC) which the present computing device with multi-display functionality may be implemented. Computer system 2900 includes a processor 2905, a system memory 2911, and a system bus 2914 that couples various system components including the system memory 2911 to the processor 2905. The system bus 2914 may be any of several types of bus structures including a memory bus or memory controller, a peripheral bus, or a local bus using any of a variety of bus architectures. The system memory 2911 includes read only memory (ROM) 2917 and random access memory (RAM) 2921. A basic input/output system (BIOS) 2925, containing the basic routines that help to transfer information between elements within the computer system 2900, such as during startup, is stored in ROM 2917. The computer system 2900 may further include a hard disk drive 2928 for reading from and writing to an internally disposed hard disk, a magnetic disk drive 2930 for reading from or writing to a removable magnetic disk (e.g., a floppy disk), and an optical disk drive 2938 for reading from or writing to a removable optical disk 2943 such as a CD (compact disc), DVD (digital versatile disc), or other optical media. The hard disk drive 2928, magnetic disk drive 2930, and optical disk drive 2938 are connected to the system bus 2914 by a hard disk drive interface 2946, a magnetic disk drive interface 2949, and an optical drive interface 2952, respectively. The drives and their associated computer-readable storage media provide non-volatile storage of computer-readable instructions, data structures, program modules, and other data for the computer system 2900. Although this illustrative example includes a hard disk, a removable magnetic disk 2933, and a removable optical disk 2943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present computing device with multi-display functionality. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk, optical disk 2943, ROM 2917, or RAM 2921, including an operating system 2955, one or more application programs 2957, other program modules 2960, and program data 2963. A user may enter commands and information into the computer system 2900 through input devices such as a keyboard 2966, pointing device (e.g., mouse) 2968, or touch-screen display 2973. Other input devices may include a microphone, joystick, game pad, satellite dish, scanner, trackball, touchpad, touch-sensitive device, voice-command module or device, user motion or user gesture capture device, or the like. These and other input devices are often connected to the processor 2905 through a serial port interface 2971 that is coupled to the system bus 2914, but may be connected by other interfaces, such as a parallel port, game port, or universal serial bus (USB). A monitor 2973 or other type of display device is also connected to the system bus 2914 via an interface, such as a video adapter 2975. In addition to the monitor 2973, personal computers typically include other peripheral output devices (not shown), such as speakers and printers. The illustrative example shown in FIG. 29 also includes a host adapter 2978, a Small Computer System Interface (SCSI) bus 2983, and an external storage device 2976 connected to the SCSI bus 2983.

The computer system 2900 is operable in a networked environment using logical connections to one or more remote computers, such as a remote computer 2988. The remote computer 2988 may be selected as another personal computer, a server, a router, a network PC, a peer device, or other common network node, and typically includes many or all of the elements described above relative to the computer system 2900, although only a single representative remote memory/storage device 2990 is shown in FIG. 29. The logical connections depicted in FIG. 29 include a local area network (LAN) 2993 and a wide area network (WAN) 2995. Such networking environments are often deployed, for example, in offices, enterprise-wide computer networks, intranets, and the Internet.

When used in a LAN networking environment, the computer system 2900 is connected to the local area network 2993 through a network interface or adapter 2996. When used in a WAN networking environment, the computer system 2900 typically includes a broadband modem 2998, network gateway, or other means for establishing communications over the wide area network 2995, such as the Internet. The broadband modem 2998, which may be internal or external, is connected to the system bus 2914 via a serial port interface 2971. In a networked environment, program modules related to the computer system 2900, or portions thereof, may be stored in the remote memory storage device 2990. It is noted that the network connections shown in FIG. 29 are illustrative and other means of establishing a communications link between the computers may be used depending on the specific requirements of an application of the present computing device with multi-display functionality.

Various exemplary embodiments are provided. According to one embodiment, disclosed is a computing device, comprising: one or more processors; and one or more hardware-based memory devices having computer-executable instructions for execution by the one or more processors; a primary display on which graphical elements are presented to a user; and a hinge that is connected to and which extends from the primary display, wherein the hinge includes a mating member extending away from the computing device to enable connections with other computing devices.

In another example, the mating member is a pin that extends from the hinge, and wherein the pin has a ball on its end. Another embodiment further comprises one or more pegs extending from the hinge. In another example, a peg is positioned above the mating member on an upper portion of the hinge. As another example, a second peg is positioned below the mating member on a lower portion of the hinge. As another example, the pin and one or more pegs mate with a secondary display to provide the user with a dual-display setup. In another example, the hinge includes an indentation to enable the hinge to move forward and backward relative to the primary display. In another example, the indentation forms a v-shape on the hinge. In another example, the primary display includes an internal cavity inside of which the hinge moves into and out. Another example further comprises tracks inside the internal cavity on which the hinge slides. In another example, respective sets of tracks are positioned on an upper portion and a lower portion of the internal cavity. Another example further comprises a second hinge positioned on a side of the primary display opposite the hinge, and wherein secondary displays are respectively connected to the hinges to provide a three-display computing environment. In another example, an internal cavity of the primary display is sized to receive and store both hinges and both secondary displays.

Another embodiment includes a laptop computing device configured to provide a multi-display setup for a user, comprising: a primary display on which graphical elements are presented to a user; an internal cavity within the primary display; one or more tracks inside the internal cavity; one or more secondary displays respectively disposed on the one or more tracks within the internal cavity of the primary display, wherein the one or more secondary displays move about the respective tracks to extend outside of the internal cavity or be stored within the internal cavity.

Another example further comprises locking mechanisms inside the internal cavity and to which the secondary displays engage with to secure into place while positioned inside the internal cavity. In another example, the locking mechanisms in the internal cavity are holes inside which spring-loaded locking pins engage with when aligned. Another example further comprises a screen release button which causes the secondary display's locking pins to compress and thereby disengage from the holes to release the secondary displays from the internal cavity of the primary display for use. Another example further comprises hinges for each respective secondary display, wherein the hinges are secured to the tracks of the internal cavity within the primary display and are releasably engaged with the secondary displays.

In another embodiment is a portable computing device, comprising one or more processors; one or more hardware-based memory devices storing computer-executable instructions for execution by the one or more processors; a keyboard to enable a user to provide input to the portable computing device; a primary display for presenting graphical elements to a user; and a hinge connected to the primary display of the portable computing device, the hinge having a connection mechanism adapted to connect to secondary devices for use with the portable computing device, wherein the hinge is adapted to enable forward and backward movement and rotational movement of the secondary devices about the hinge. In another example, the hinge includes a center pin having a shaft and a ball about which the rotational movement occurs. In another example, the hinge is comprised of a durable layer on a portion adjacent to the portable computing device and a durable layer on a portion adjacent to where the secondary devices connect, and wherein a relatively thinner layer of material is positioned between the durable layers to enable bending about the hinge.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A primary computing device, comprising:
   one or more processors;
   one or more hardware-based memory devices having computer-executable instructions for execution by the one or more processors;
   a primary display on which graphical elements are presented to a user;
   a hinge that is connected to and which extends from the primary display, wherein the hinge includes a mating member extending away from the primary computing device to enable connections with secondary computing devices, in which the mating member includes a pin that extends laterally from the hinge and a ball on an end of the pin that is opposite the hinge; and
   one or more pegs extending laterally from the hinge and in a like direction as the mating member, wherein the one or more pegs are at least partially flat.

2. The primary computing device of claim 1, wherein the one or more pegs includes an upper peg and a lower peg, in which the upper peg is positioned above the mating member on the hinge and the lower peg is positioned below the mating member on the hinge.

3. The primary computing device of claim 2, wherein a secondary computing device includes a horizontally-oriented socket that at least partially corresponds to a shape of the mating member's ball, wherein the socket has a contracted and expanded state to enable removable engagement with the mating member.

4. The primary computing device of claim 3, wherein the secondary computing device includes horizontally-oriented openings that respectively receive the upper and lower pegs.

5. The primary computing device of claim 4, wherein the secondary computing device includes sliding elements that prevent rotational movement of the secondary computing device about the mating member when the sliding elements are in a closed position, and the sliding elements permit rotational movement when the sliding elements are in an open position.

6. The primary computing device of claim 5, wherein the secondary computing device includes a release button that causes the socket to enter an expanded state and thereby disengage from the mating member.

7. The primary computing device of claim 5, wherein the sliding elements include ridges to provide enhanced grip to a user.

8. The primary computing device of claim 1, further comprising a ridge that extends from and vertically parallel to the hinge, the ridge being on a side of the hinge opposite the mating member, wherein the ridge engages with and moves along a track inside the primary computing device.

9. The primary computing device of claim 8, further comprising:
   a locking pin hole positioned at a base of the primary computing device's track; and
   a spring-loaded locking pin extending perpendicular from a secondary computing device that is connected to the hinge, in which the spring-loaded locking pin engages with the locking pin hole when the secondary computing device is inserted into an internal cavity of the primary computing device and the locking pin hole and the spring-loaded locking pin are aligned.

10. The primary computing device of claim 8, wherein the tracks form a channel and inside which the hinge's ridge moves.

11. The primary computing device of claim 10, further comprising a lip at an end of the channel, wherein the ridge engages with the lip to prevent the hinge from fully detaching from the primary computing device.

12. A hinge for removably connecting a primary computing device to a secondary computing device, comprising:
   a primary side that is adapted to connect to the primary computing device; and
   a mating member that is comprised of a pin and a ball that is positioned on an end of the pin, wherein the pin extends laterally from a secondary side of the hinge, the secondary side being opposite the primary side, and
   wherein the mating member engages with a horizontally-oriented socket on the secondary computing device, wherein the socket, when in a contracted state, is configured to correspond in shape and size to the ball of the mating member, and
   wherein the socket is configured to enter an expanded state to enable release of the secondary computing device from the ball of the mating member, and thereby disengage the secondary computing device from the primary computing device.

13. The hinge of claim 12, wherein the primary side connects to a channel inside an internal cavity of the primary computing device.

14. The hinge of claim 13, wherein the primary side includes a ridge that slides along the channel, and wherein the ridge engages with a lip within the channel to prevent full release of the hinge from the primary computing device.

15. The hinge of claim 12, further comprising a peg that extends laterally from the hinge, wherein the secondary computing device, when connected to the mating member, rotates about the mating member, and the peg either prevents or enables rotational movement of the secondary computing device depending on whether the peg engages with a release element.

16. The hinge of claim 15, wherein the peg engages with and is received within an opening on the secondary computing device, and the release element is a sliding element that opens and closes the opening to thereby prevent or enable the rotational movement.

* * * * *